US012695924B1

(12) United States Patent
McGranahan et al.

(10) Patent No.: US 12,695,924 B1
(45) Date of Patent: Jul. 28, 2026

(54) SYSTEM AND METHOD FOR LOW-LATENCY STREAMING OF VOLUMETRICALLY CAPTURED LIVE EVENTS ACROSS MULTIPLE VENUES AS HOLOGRAMS

(71) Applicant: Indranet Inc., Carbondale, CO (US)

(72) Inventors: Hunter McGranahan, Carbondale, CO (US); Antonio Stranges, Torrance, CA (US); Henry Engelland-Gay, Urbana, IL (US); Xavier Rodríguez Navarro, Pas de la Casa (AD); Lukáš Hajka, Trencianske Teplice (SK)

(73) Assignee: Indranet Inc., Carbondale, CO (US)

( * ) Notice: Subject to any disclaimer, the term of this patent is extended or adjusted under 35 U.S.C. 154(b) by 0 days.

(21) Appl. No.: 19/538,647

(22) Filed: Feb. 12, 2026

Related U.S. Application Data

(60) Provisional application No. 63/829,429, filed on Jun. 24, 2025.

(51) Int. Cl.
H04N 21/2187 (2011.01)
G03H 1/04 (2006.01)
(Continued)

(52) U.S. Cl.
CPC ....... H04N 21/2187 (2013.01); G03H 1/0443 (2013.01); G03H 1/2294 (2013.01);
(Continued)

(58) Field of Classification Search
CPC .......... H04N 21/2187; H04N 21/4307; G03H 1/0443; G03H 1/2294
See application file for complete search history.

(56) References Cited

U.S. PATENT DOCUMENTS 9,164,481 B2 * 10/2015 Tsang ........................ G03H 1/02
11,423,621 B1 * 8/2022 Atlas ......................... G06T 5/92
(Continued)

FOREIGN PATENT DOCUMENTS

WO      WO 2024238342 A2    11/2024

OTHER PUBLICATIONS

Kerbl et al., "3D Gaussian Splatting for Real-Time Radiance Field Rendering," ACM Transactions on Graphics (TOG), Jul. 26, 2023, 42(4):139, pp. 1-14.

*Primary Examiner* — Esther B. Henderson
(74) *Attorney, Agent, or Firm* — Fish & Richardson P.C.

(57) ABSTRACT

Systems and methods for delivering next-generation live experiences through the integration of volumetric capture, low-latency streaming, advanced holographic display systems, and real-time audience interactivity, all coordinated via a unified software platform. The systems and methods enable performances or experiences in a single location with photorealistic holographic presence simultaneously projected to multiple remote venues, thereby increasing accessibility, affordability, and fostering a more community-driven live experience. Systems and methods include a volumetric capture rig configured to capture one or more subjects in three dimensions in real time. Systems and methods include a low-latency streaming module configured to encode, compress, and transmit volumetric data to one or more remote venues. Systems and methods include one or more holographic display devices at each remote venue, configured to render the volumetric data as one or more holograms visible from multiple angles.

23 Claims, 11 Drawing Sheets

(51) Int. Cl.
    *G03H 1/22*         (2006.01)
    *H04L 65/75*      (2022.01)
    *H04N 21/414*    (2011.01)
    *H04N 21/43*     (2011.01)
    *H04S 7/00*        (2006.01)

(52) U.S. Cl.
    CPC ....... *H04L 65/75* (2022.05); *H04N 21/41415*
        (2013.01); *H04N 21/4307* (2013.01); *H04S*
                             *7/302* (2013.01)

(56)           References Cited

U.S. PATENT DOCUMENTS

| | | | | |
|---|---|---|---|---|
| 12,169,275 B2 * | 12/2024 | Karafin | .................. | G06N 3/092 |
| 2019/0271943 A1 * | 9/2019 | Bezirganyan | ........ | H04N 13/302 |
| 2023/0070130 A1 * | 3/2023 | Karafin | ................... | G06N 3/09 |

* cited by examiner

SYSTEM AND METHOD FOR LOW-LATENCY STREAMING OF VOLUMETRICALLY CAPTURED LIVE EVENTS ACROSS MULTIPLE VENUES AS HOLOGRAMS

CROSS-REFERENCE TO RELATED APPLICATIONS

The present application claims priority to U.S. Provisional Patent Application No. 63/829,429, filed on Jun. 24, 2025, entitled "SYSTEM AND METHOD FOR LOW-LATENCY STREAMING OF VOLUMETRICALLY CAPTURED LIVE EVENTS ACROSS MULTIPLE VENUES AS HOLOGRAMS," which is incorporated herein by reference in its entirety for all purposes.

TECHNICAL FIELD

The present disclosure relates to live performances, trainings, and any form of entertainment, specifically to systems and methods for volumetrically capturing, transmitting, and displaying real-time holographic projections across multiple remote venues, enabling simultaneous, immersive experiences for geographically distributed audiences.

SUMMARY

Unless otherwise defined, all technical and scientific terms used herein have the same meaning as commonly understood by one of ordinary skills in the art to which this disclosure belongs. Methods and materials are described herein for use in the present disclosure. Other suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Traditional live performances are limited by physical constraints, high costs, and limited geographic accessibility. While live-streamed concerts to two-dimensional (2D) screens and pre-recorded hologram shows exist today, there is a need for a system that enables real-time, photorealistic, volumetrically captured and holographically live streamed three-dimensional (3D) performances to be experienced simultaneously in multiple venues, preserving the communal and emotional aspects of live experiences.

The disclosure provides a system and method for capturing one or more live subjects (such as one or more humans or animals) volumetrically, compressing and transmitting the data with low-latency, and rendering a photorealistic, life-like holographic projection in multiple remote venues at the same time. The system includes audience interactivity features, spatial audio, and real-time feedback loops to enhance the sense of presence, connection, togetherness and community.

These aspects and other features and advantages of the disclosure are described below in more detail.

BRIEF DESCRIPTION OF THE FIGURES

The foregoing and other features and advantages of the present disclosure will be more fully understood from the following detailed description of illustrative implementations taken in conjunction with the accompanying drawings.

The figures and illustrations accompany and further elucidate the implementations described herein. These visual representations are intended to supplement the written description and facilitate a clearer understanding of the disclosure as set forth in this application.

DETAILED DESCRIPTION

Figure 1:
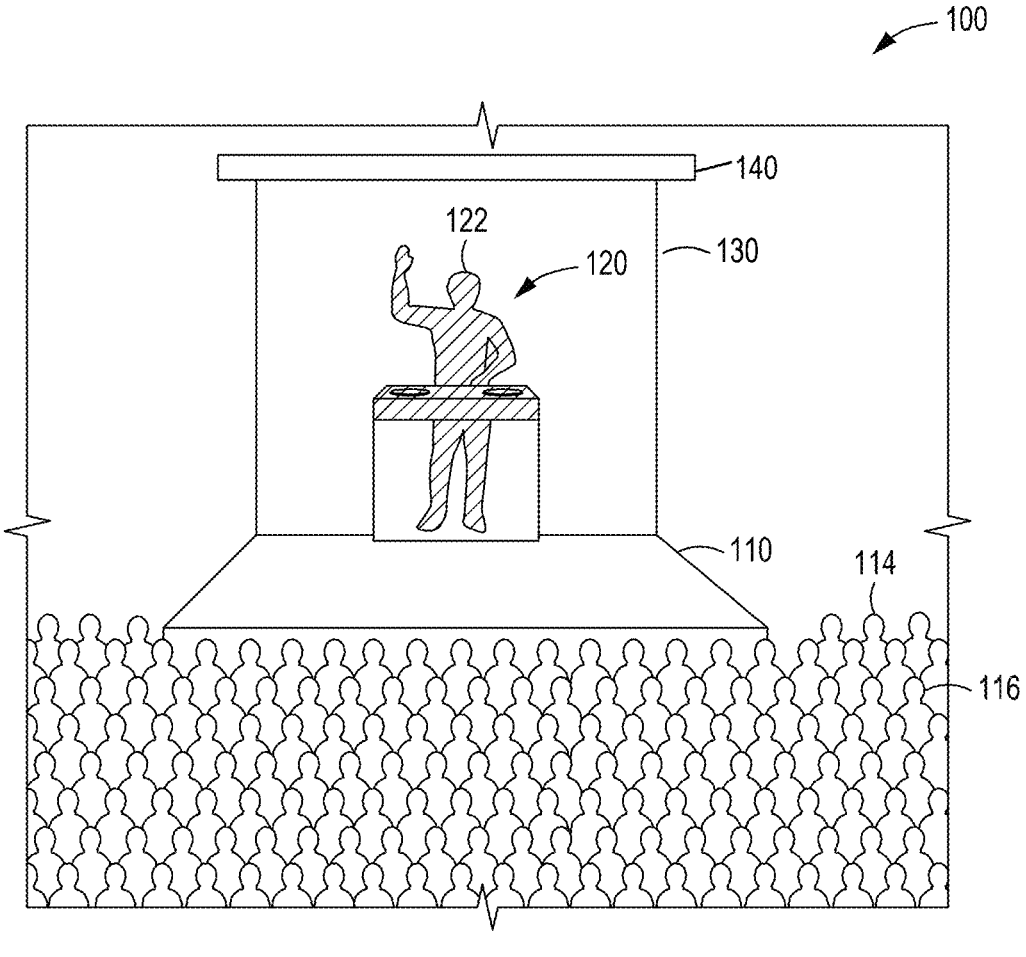
FIG. 1 is an illustration of a front perspective view of an example of a 180-degree visible holographic display system (e.g., projector- or screen-based), showing a life-sized, three-dimensional subject projected on a stage at a remote venue, with audience seating arranged in a 180-degree configuration.

As used herein, the term "holographic show(s)" refers to an event format in which a subject(s)'s in-the-flesh event is volumetrically captured and streamed in real-time as a three-dimensional, photorealistic hologram to one or more remote venues simultaneously.

As used herein, the term "subject" refers to any being capable of being volumetrically captured using a volumetric capture rig and being streamed in real-time as a three-dimensional, photorealistic hologram to a remote venue. Examples of subjects include, but are not limited to, humans, animals, artists, athletes, actors, comedians, celebrities, instructors, leaders, models, performers, speakers, pastors, politicians, non-human primates, gorillas, apes, chimpanzees, dogs, cats, and horses.

As used herein, the term "volumetric capture" or "volcap" refers to a process for generating a time-varying, photorealistic, three-dimensional digital representation of one or more subjects in real-time. This representation is capable of being dynamically re-lit to match the lighting of an environment associated with a remote venue and maintains highly accurate form and appearance as the subject moves.

As used herein, the term "hologram" or "holographic projection" refers to a three-dimensional image, generated from digital data, that creates the illusion of a solid object or scene in a physical space, visible from multiple viewpoints.

As used herein, the term "low-latency streaming" refers to transmitting volumetrically captured data with a minimal delay to one or more remote venues, wherein the delay is sufficiently short to be imperceptible to a human observer, thereby preserving the sense of a live, interactive experience between the subject and the remote audiences. For example, the low-latency is in a range less than or equal to 150 ms. In some examples, the low-latency may be less than 50 ms.

As used herein, the term "holographic display" refers to a system for rendering 3D data into a lifelike hologram, creating the illusion of one or more live subjects on stage. Such systems may include, but are not limited to, holographic scrims, Pepper's Ghost systems, lenticular lenses, floating light-field technology, LED volumetric arrays, or combinations thereof.

As used herein, the term "remote venue" refers to a venue to which a holographic show is streamed and which is "remote" from, or located at some physical distance from, the venue at which the holographic show is volumetrically captured.

As used herein, the term "audience interactivity" refers to real-time audience feedback and cross-venue engagement, e.g., using artificial intelligence (AI)-driven sentiment analysis and interactive effects to foster a communal, participatory experience that connects audiences across all locations. Audience interactivity may include real-time sentiment analysis, crowd-triggered visual or audio effects, and cross-venue communication.

As used herein, the term "experience elements" refers to components of the synchronized live experience beyond the primary holographic projection itself, including but not limited to spatial audio, lighting effects, and other visual or interactive effects that contribute to the immersive environment in the remote venues.

As used herein, the term "orchestration layer" refers to a software platform that synchronizes all technical and creative elements—volumetric capture, streaming, rendering, holographic projecting, lighting, audio, and interactivity—across the one or more remote venues, permitting a seamless, emotionally resonant event across the remote venues.

As used herein, "about" and the term "approximately," means the recited quantity exactly and small variations within a limited range encompassing plus or minus 10% of the recited quantity. In other words, the limited range encompassed can include ±10%, ±9%, ±8%, ±7%, ±6%, ±5%, ±4%, ±3%, ±2%, ±1%, ±0.5%, ±0.2%, ±0.1%, ±0.05%, or smaller, as well as the recited value itself Thus, by way of example, "about 10" should be understood to mean "10" and a range no larger than "9-11." For clarity, as used herein, designation of a range of values includes all integers within or defining the range, and all subranges defined by integers within the range.

As used herein, the term "and/or" refers to and encompasses any and all possible combinations of one or more of the associated listed items, as well as the lack of combinations when interpreted in the alternative ("or").

As used herein, term "or" refers to any one member of a particular list and also includes any combination of members of that list, excluding any such combinations that are impossible or impracticable. That is, the term "or" shall be interpreted to carry both conjunctive and disjunctive meanings, excluding any such meaning that is impossible or impracticable. For instance, the term "A or B" shall be interpreted as including element A alone, element B alone, and the combination of elements A and B, excluding any such meaning that is impossible or impracticable. As another example, the term "A, B, or C" shall be interpreted as including element A alone, element B alone, element C alone, the combination of elements A and B but not element C, the combination of elements A and C but not element B, the combination of elements B and C but not element A, and the combination of elements A, B, and C, excluding any such meaning that is impossible or impracticable.

The singular forms of the articles "a," "an," and "the" include plural references unless the context clearly dictates otherwise. For example, the term "a pest" or "at least one pest" can include a plurality of proteins, including mixtures thereof.

As used herein, the term "comprising" is intended to mean that the compositions and methods include the recited elements, but not excluding others. "Consisting essentially of" when used to define compositions and methods, shall mean excluding other elements of any essential significance to the composition or method. "Consisting of" shall mean excluding more than trace elements of other ingredients for claimed compositions and substantial method steps. Examples and implementations defined by each of these transition terms are within the scope of this disclosure. Accordingly, it is intended that the methods and compositions can include additional steps and components (comprising) or alternatively including steps and compositions of no significance (consisting essentially of) or alternatively, intending only the stated method steps or compositions (consisting of).

One skilled in the art will also readily recognize that where members are grouped together in a common manner, such as in a Markush group, the disclosure encompasses not only the entire group listed as a whole, but each member of the group individually and all possible subgroups of the main group. Additionally, for all purposes, the disclosure encompasses not only the main group, but also the main group absent one or more of the group members. The disclosure therefore envisages the explicit exclusion of any one or more of members of a recited group. Accordingly, provisos may apply to any of the disclosed categories or implementations whereby any one or more of the recited elements, species, or implementations, may be excluded from such categories or implementations, for example, for use in an explicit negative limitation. For example, where the disclosure describes a "holographic display" without a "live performer," this is also intended to provide antecedent basis for a negative limitation.

"Statistically significant" means p≤0.05.

All of the functionalities described in connection with one implementation of the methods, compositions, or formulations described herein are intended to be applicable to the additional implementations of the methods, compositions, or formulations described herein except where expressly stated or where the feature or function is incompatible with the additional implementations. For example, where a given feature or function of component is expressly described in connection with one implementation but not expressly mentioned in connection with an alternative implementation, it should be understood that the feature or component may be deployed, utilized, or implemented in connection with the alternative implementation unless the feature or component is incompatible with the alternative implementation.

Provided herein are systems and methods for delivering next-generation live experiences through the integration of volumetric capture, low-latency streaming, advanced holographic display systems, and real-time audience interactivity, all coordinated via a unified software platform. The systems and methods may enable experiences in a single location with photorealistic holographic presence simultaneously projected to multiple remote venues, thereby increasing accessibility, affordability, and fostering a more community-driven live experience. Systems and methods may include a volumetric capture rig configured to capture one or more subject in three dimensions, preserving photorealistically accurate form, appearance, and motion, in-real-time. Systems and methods may include a low-latency streaming module (may also be referred to as a "proprietary compression algorithm") configured to encode, compress, and transmit volumetric data to one or more remote venues. Systems and methods may include one or more holographic display devices at each remote venue, configured to render the volumetric data as a photorealistic, life-sized hologram visible from multiple angles.

The systems and methods described herein generally solve the problem that live experiences (e.g., of concerts or other entertainment events) have been too expensive and inaccessible for many people. Such expenses are associated with service fees and add-ons, dynamic pricing algorithms, resale market inflation, and/or increased production costs. For instance, service fees and add-ons mean that a base ticket price is no longer the only expense associated with such live events. For instance, service fees, facility charges, and even so-called "convenience" fees add another layer of cost, which sometimes total 20%-30% of the original ticket price. Ticketing platforms often use pricing algorithms that adjust ticket costs based on demand, and can sometimes double or even triple prices in a very short time period (e.g., minutes). Scalpers and resale sites may take advantage of demand by buying bulk tickets and reselling them at inflated prices. Moreover, increased production costs may arise due to performers putting on bigger, more extravagant events, and passing the costs down to ticket buyers.

The systems and methods generally solve these problems by volumetrically capturing subjects (e.g., artists, athletes, actors, comedians, celebrities, instructors, leaders, models, speakers, pastors, politicians, and the like) at their primary venue in front of a live audience, and live-streaming high-fidelity holograms of the subjects to remote venues. By utilizing live volumetric streaming and holographic telepresence, the systems and methods may decrease ticket prices for consumers while also increasing profits for other stakeholders (e.g., artists, venues, promoters, controllers, ticketing services, etc.). In addition to increased affordability, such mirrored, simultaneous events may make community-based live events accessible to a greater number of people or communities.

A volumetric capture rig, or volcap rig, may serve as a foundation for creating immersive holographic performances. The volcap rig may be portable or fixed, and may utilize multi-camera arrays to generate a time-varying 3D representation of the one or more subjects in real-time. The volcap rig may include compute infrastructure, such as edge devices and/or server architecture, integrated into a local network with the volcap rig and enabling the real-time generation of the 3D representation.

The disclosed volcap rig may be designed as either a portable or fixed installation, depending on the needs of each of the one or more remote venues (which may or may not vary across the remote venues) and the touring schedule of the one or more subjects. Portable rigs may be ideal for on-tour or pop-up holographic shows, while fixed installations may be suited for residencies or venues that frequently host holographic events. The volcap rig itself may include a sophisticated array of synchronized high-resolution cameras strategically positioned around the performer to capture every angle in real time.

For instance, the volcap rig may comprise at least about 10, 20, 30, 40, 50, 60, 70, 80, 90, 100, or more synchronized high-resolution cameras, at most about 100, 90, 80, 70, 60, 50, 40, 30, 20, 10, or less synchronized high-resolution cameras, or a number of synchronized high-resolution cameras that is within a range defined by any two of the preceding values. These camera arrays may be complemented by advanced depth sensors and light detection and ranging (Lidar) technology, which works to extract precise spatial and motion data. Controlled lighting may ensure consistent illumination and accurate color capture, while markerless motion capture and facial rigging systems may record subtle expressions and gestures. The result is a time-varying photorealistic 3D representation of the one or more subjects, visually indistinguishable from the real subjects, ready for immediate streaming to remote venues, devices, and locations.

Once the one or more subjects' 3D representation(s) is generated, the low-latency volumetric streaming module may be responsible for transmitting this high-bandwidth volumetric data to multiple remote venues with minimal delay. The streaming module may leverage edge cloud infrastructure and adaptive codecs to minimize latency and bandwidth requirements.

The low-latency volumetric streaming module may leverage edge cloud infrastructure, which may bring computational resources closer to the end user, reducing transmission times and ensuring a truly live experience across the remote venues. Adaptive volumetric codecs, such as MPEG V-PCC, V-Nova VC6, or AV1 extensions, may compress the massive data streams efficiently, dynamically adjusting quality based on available bandwidth without sacrificing the sense of presence at each of the remote venues. The system may also utilize foveated rendering and 5G/mm Wave networks to further optimize performance and can be designed with satellite or redundant network support (e.g., Starlink, Google Fiber) for geographically remote or underserved markets. Audio, visual, and effects data may be synchronized in real time, permitting every nuance of the performance to be faithfully reproduced across all remote venues.

At the remote venues, holographic display systems are installed to render the streamed volumetric data into a lifelike, three-dimensional illusion of the performer. Holographic displays may be installed permanently or temporarily in venues, utilizing technologies that may include, but are not limited to, holographic scrims, Pepper's Ghost systems, lenticular lenses, transparent LED screens, rear-projection foils, anamorphic displays, floating light-field technology, LED volumetric arrays, or combinations thereof, to create a convincing illusion of presence.

These displays can be permanent fixtures in high-demand venues or temporarily deployed for special events and tours. The technology stack can include a range of options.

For instance, projection-based systems may use holographic scrims or Pepper's Ghost techniques, which create the illusion of a performer on stage visible from multiple angles. As another example, screen-based systems may use lenticular lenses, transparent LED screens, rear-projection foils, or anamorphic displays to create a similar illusion of depth and presence, and offer high brightness and scale suitable for large crowds and dynamic lighting environments.

Further, floating light-field displays and LED volumetric arrays, which may provide true volumetric presence without the need for glasses or scrims, may deliver a next-generation sense of realism. These systems are engineered for flexibility, allowing adaptation to various stage layouts and audience sizes, and are capable of fast local decoding to maintain visual fidelity and minimize perceptible lag.

A key differentiator of holographic shows is the integration of real-time audience interactivity, transforming passive viewing into a participatory, communal experience. Advanced sentiment analysis tools (e.g., using computer vision, microphone arrays, and biometric sensors) may interpret crowd energy, engagement, and emotion. This data can trigger dynamic visual or audio effects, such as generative visuals that evolve in response to audience excitement, or spatial audio cues that move with the one or more holographic subjects. Cross-venue communication features may allow audiences in different remote venues to see and interact with each other, fostering a sense of shared presence and collective celebration. Interactive elements may include crowd-triggered lighting, live-streamed 2D video, AI-moderated effects, and even real-time feedback loops where the one or more subjects can respond to the energy of remote audiences, blurring the line between physical and virtual attendance.

The orchestration layer may be implemented as a robust software platform that may act as the connective tissue for the entire holographic show ecosystem. This platform may integrate real-time show control, multi-venue synchronization, and feedback processing.

The orchestration layer may manage seamless coordination of volumetric capture, low-latency streaming, and holographic rendering across all participating venues. The orchestration layer may ensure that every aspect of the performance, from lighting and audio to interactive effects and cross-venue communication, is synchronized, regardless of varying geographic distances between remote venues.

The orchestration layer may leverage data-collection systems at individual remote venues, to observe their unique lighting environments, and subsequently re-light the 3D holographic data to match this unique lighting. This configuration may enable the hologram to blend seamlessly into the real world environment of each of the remote venues.

The orchestration layer may also process audience feedback in real time, enabling adaptive show elements and ensuring a cohesive, emotionally resonant experience for all attendees at each of the remote venues. This software may also provide interfaces for creative teams to design, monitor, and adjust the show dynamically, making it possible to deliver complex, multi-location events with unprecedented precision and flexibility.

The orchestration layer may be implemented as a software platform integrating show control, synchronization, and feedback processing.

Gaussian Splatting represents a significant breakthrough in the field of real-time volumetric capture and rendering, directly addressing the technical bottlenecks that have historically limited the feasibility of live, multi-venue holographic experiences. At its core, Gaussian Splatting is a novel rendering technique that models 3D scenes using a collection of spatially distributed Gaussian functions, rather than traditional polygonal meshes or point clouds. Each Gaussian "splat" encodes not only position and color, but also orientation, scale, and opacity, allowing for highly efficient, photorealistic representation of complex, dynamic scenes, and for easily re-lighting those scenes dynamically.

In the context of a volumetrically captured, live-streamed holographic experience system, Gaussian Splatting may be leveraged to represent one or more subjects' 3D data with unparalleled fidelity, and to subsequently render the data in real time, with the ability to dynamically re-light the data at render-time, according to the real-world lighting at each of the remote venues. Multi-camera arrays capture the subject(s) from multiple angles, and the system's real-time 3D reconstruction software translates this data into a set of dynamic Gaussian splats. Camera systems at each remote venue observe the lighting environments, and the orchestration software layer ensures the core 3D data is digitally lit based on the lighting environment at each distinct remote venue. The result is a one-to-one 3D model of the subjects(s) that maintains spatial fidelity, subtle lighting effects, and smooth motion, even under the demanding conditions of a live broadcast.

The low-latency streaming module may be specifically designed to handle the unique data structure produced by Gaussian Splatting. Advanced volumetric codecs and adaptive bitrate encoders may efficiently compress and transmit the Gaussian splat data to the remote venues, permitting the holographic display devices to receive a continuous, high-fidelity stream. This may enable the holographic projections to appear lifelike and responsive, with minimal perceptible delay between the one or more subjects' actions and their holographic representation(s) across the multiple remote venues.

On the display side, holographic devices may be optimized to decode and render Gaussian splat data in real time. The inherent properties of Gaussian Splatting may allow for smooth blending, accurate depth cues, and realistic lighting adaptation, which may permit the illusion of a live, in-room human experience. The orchestration layer coordinates the rendering parameters across all remote venues, permitting the holographic experience remains synchronized and visually consistent, regardless of local lighting or environmental conditions.

By integrating rendering techniques such as Gaussian Splatting into the system architecture, the systems and methods may enable a new class of scalable, immersive, and cost-effective holographic experiences. This approach may not only enhance the visual realism and responsiveness of the holograms but may also make it technically and financially feasible to deliver simultaneous, high-quality live experiences to multiple remote venues, thereby transforming the accessibility and economics of live experiences.

The person of ordinary skill in the art will recognize that the holograms described herein may be displayed at each remote venue in a number of different manners, and that different remote venues may display the holograms in the same manner or in different manners. For instance, the holograms may be displayed in a proscenium or traditional front-facing manner. The proscenium display style is most common in theaters and auditoriums and features an audience seated entirely in front of the hologram, facing the stage. Such a setup may allow for the projection of holograms in remote venues with fixed seating arrangements, such as schools, legacy concert halls, and the like, and may simplify the light or audio projection technology for the projection of the holograms.

As another example, the holograms may be displayed in an in-the-round or arena style, with projection to a 360° field of view. In such case, the audience fully surrounds the holograms. Such a display may be used, for instance, when no backstage is available, for sporting events, for political rallies, and the like.

As another example, the holograms may be displayed in a thrust or runway style. In this example, the audience is seated on three sides of a long, extended stage where the holograms are projected. Such a style of display may be used for fashion shows, product launches, keynote speeches, and immersive theater, and may add versatility for branded or commercial events.

As another example, the holograms may be displayed in an intimate or small group configuration style. In this example, a small audience is seated in a circular or horse-shoe manner around the holograms. This style may be utilized, for instance, for meditation, teaching, healing, or other small-group interactive sessions.

As another example, the holograms may be displayed in a flat or plaza configuration. In this example, the audience is standing on all sides of the holograms with no fixed seating. This style may be used for events that could feature irregular or outdoor spaces, such as festivals, town squares, or other open-air venues, including pop-up and street events or performances.

The person of ordinary skill in the art will also recognize that multiple remote venues may be located within a portion of an area that would often be considered as a single venue. For instance, holograms of a performer in one room of a building may be projected to multiple other rooms (each of which constitutes a remote venue) of the same building. This may permit the use of the systems and methods herein for e.g., overflow audiences, mega-churches, conference centers, and the like.

One or more examples of remote venues and holographic display devices, audio systems, and audience feedback modules contained therein are described below.

FIGS. 1, 2A, 2B, and 3 generally depict remote venues configured to receive volumetric data captured by a volumetric capture rig and encoded, compressed, and transmitted by a low-latency streaming module, such as the volumetric capture rigs and low-latency streaming modules described herein above or with respect to FIGS. 4 and 5.

FIG. 1 is an illustration of a front perspective view of an example of a 180-degree visible holographic display system (e.g., projector- or screen-based), showing a life-sized, three-dimensional subject projected on a stage at a remote venue, with audience seating arranged in a 180-degree configuration.

For instance, FIG. 1 illustrates venue 100, stage 110, audience seating 114, audience 116, holographic display area 120, hologram image of life-sized 3D subject 122, and screen/scrim 130 and one or more projectors 140.

As shown in FIG. 1, the remote venue 100 features a stage 110. Audience seating 114 (and an audience 116 seated therein) is arranged in a 180-degree configuration around the stage 110. The stage 110 features a holographic display area or device 120, in this case a holographic screen/scrim 130. In some examples, one or more projectors 140 and the holographic screen/scrim 130 may operate in tandem to render volumetric data received by the remote venue from a low-latency module, such as a low-latency module described herein above or with respect to FIG. 4. The volumetric data is rendered as a hologram image 122 of a life-sized 3D subject. In the example shown, the hologram image is visible from multiple angles (e.g., from each angle in the 180-degree arc around which the audience sits).

Although depicted as using 3 projectors in FIG. 1, the remote venue may utilize any number of projectors. For instance, the remote venue may use at least about 2, 3, 4, 5, 6, 7, 8, 9, 10, 20, 30, 40, 50, 60, 70, 80, 90, 100, or more projectors, 100, 90, 80, 70, 60, 50, 40, 30, 20, 10, 9, 8, 7, 6, 5, 4, 3, or 2 projectors, or a number of projectors that is within a range defined by any two of the preceding values.

Although depicted as utilizing a screen/scrim and projectors to generate the hologram image in FIG. 1, the remote venue may utilize any holographic display devices described herein, such as holographic scrims, Pepper's Ghost systems, lenticular lenses, transparent LED screens, rear-projection foils, anamorphic displays, floating light-field technology, LED volumetric arrays, or any possible combination thereof. Generally, the holographic display devices are configured to render the subject as a spatially present hologram visible from multiple angles (in FIG. 1, from each angle in the 180 degree arc around which the audience sits).

Although FIG. 1 depicts a single hologram of a single subject, the disclosure is not intended to be so limiting. For instance, at least about 2, 3, 4, 5, 6, 7, 8, 9, 10, 20, 30, 40, 50, 60, 70, 80, 90, 100, or more holograms, at most 100, 90, 80, 70, 60, 50, 40, 30, 20, 10, 9, 8, 7, 6, 5, 4, 3, or 2 holograms, or a number of holograms that is within a range defined by any two of the preceding values may be depicted. The holograms may be associated with at least about 2, 3, 4, 5, 6, 7, 8, 9, 10, 20, 30, 40, 50, 60, 70, 80, 90, 100, or more subjects, at most about 100, 90, 80, 70, 60, 50, 40, 30, 20, 10, 9, 8, 7, 6, 5, 4, 3, or 2 subjects, or a number of subjects that is within a range defined by any two of the preceding values.

In some implementations, the remote venue may further comprise an audio system. The audio system may comprise a spatial audio system. The audio system may be synchronized with the holographic display device(s) and configured to provide positional audio corresponding to the subject(s)'s location(s) and movements. The audio system may comprise beamforming or object-based audio technology. The audio system may be configured to deliver positional audio that tracks a location of the hologram(s) within the remote venue.

In some implementations, the remote venue may further comprise a real-time audience feedback module comprising one or more audience feedback sensors and software, such as those described herein above or with respect to FIG. 3. The real-time audience feedback module may be configured to capture crowd data and to transmit the crowd data back to the subject(s), who are not physically present at the remote venue, or to one or more (other) remote venues. The real-time audience feedback module may comprise computer vision cameras, microphone arrays, biometric sensors, or any possible combination thereof. The real-time audience feedback module may be configured to capture and analyze audience sentiment, engagement, or emotional response in real time. The real-time audience feedback module may be configured to transmit aggregated crowd sentiment data (such as audience sentiment, engagement, or emotional response) to the subject(s) (who are physically located at a location different from the remote venue), such that the subject(s) may adapt their performance, or the crowd(s) at the one or more (other) remote venues may adapt their behavior(s), in response to the aggregated crowd sentiment data.

Figure 2A:
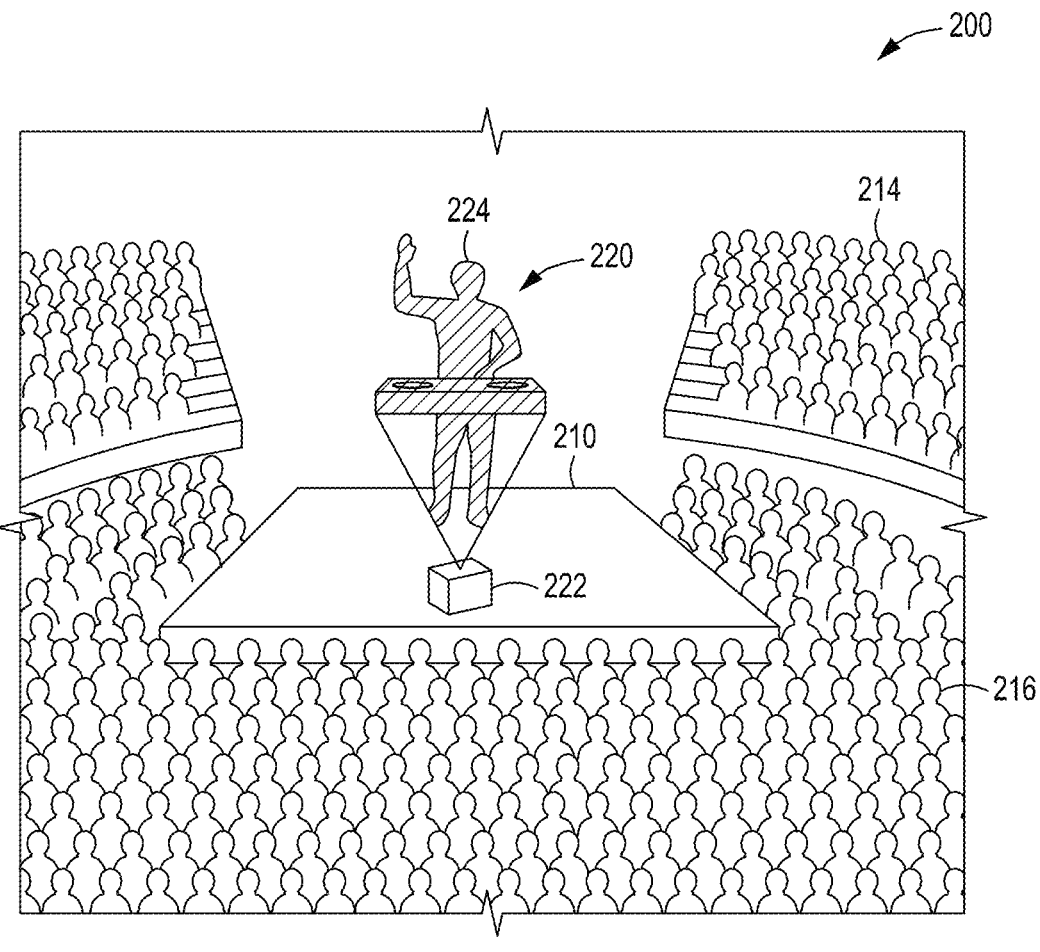
FIG. 2A is an illustration of a front perspective view of an example of a 360-degree visible holographic display system (e.g., LED volumetric array), showing a life-sized, three-dimensional subject projected on a stage at a remote venue, with audience seating arranged in a circular configuration.

FIG. 2A is an illustration of a front perspective view of an example of a 360 degree visible holographic display system (e.g., LED volumetric array), showing a life-sized, three-dimensional subject projected on a stage at a remote venue, with audience seating arranged in a circular configuration.

FIG. 2A illustrates, by way of example, venue 200, stage 210, audience seating 214, audience 216, holographic display area 220, LED volumetric array 222, and hologram image of life-sized 3D subject 224.

As shown in FIG. 2A, the remote venue 200 features a stage 210. Audience seating 214 (and an audience 216 seated therein) is arranged in a 360-degree configuration around the stage 210. The stage 210 features a holographic display area or device 220, in this case an LED volumetric array 222. In some examples, the LED volumetric array 222 may include one or more projectors. The LED volumetric array operates to render volumetric data received by the remote venue from a low-latency module, such as a low-latency module described herein above or with respect to FIG. 4. The volumetric data is rendered as a hologram image 224 of a life-sized 3D subject. In the example shown, the hologram image is visible from multiple angles (e.g., from each angle in the 360 degree circle around which the audience sits).

Although depicted as utilizing an LED volumetric array to generate the hologram image in FIG. 2A, the remote venue may utilize any holographic display devices described herein, such as holographic scrims, Pepper's Ghost systems, lenticular lenses, transparent LED screens, rear-projection foils, anamorphic displays, floating light-field technology, LED volumetric arrays, or any possible combination thereof. Generally, the holographic display devices are configured to render the subject as a spatially present hologram visible from multiple angles (in FIG. 2A, from each angle in the 360 degree circle around which the audience sits).

Although FIG. 2A depicts a single hologram of a single subject, the disclosure is not intended to be so limiting. For instance, at least about 2, 3, 4, 5, 6, 7, 8, 9, 10, 20, 30, 40, 50, 60, 70, 80, 90, 100, or more holograms, at most 100, 90, 80, 70, 60, 50, 40, 30, 20, 10, 9, 8, 7, 6, 5, 4, 3, or 2 holograms, or a number of holograms that is within a range defined by any two of the preceding values may be depicted. The holograms may be associated with at least about 2, 3, 4, 5, 6, 7, 8, 9, 10, 20, 30, 40, 50, 60, 70, 80, 90, 100, or more subjects, at most about 100, 90, 80, 70, 60, 50, 40, 30, 20, 10, 9, 8, 7, 6, 5, 4, 3, or 2 subjects, or a number of subjects that is within a range defined by any two of the preceding values.

In some implementations, the remote venue may further comprise an audio system. The audio system may comprise a spatial audio system. The audio system may be synchronized with the holographic display device(s) and configured to provide positional audio corresponding to the subject(s)'s location(s) and movements. The audio system may comprise beamforming or object-based audio technology. The audio system may be configured to deliver positional audio that tracks a location of the hologram(s) within the remote venue.

In some implementations, the remote venue may further comprise a real-time audience feedback module comprising one or more audience feedback sensors and software, such as those described herein above or with respect to FIG. 3. The real-time audience feedback module may be configured to capture crowd data and to transmit the crowd data back to the subject(s), who are not physically present at the remote venue, or to one or more (other) remote venues. The real-time audience feedback module may comprise computer vision cameras, microphone arrays, biometric sensors, or any possible combination thereof. The real-time audience feedback module may be configured to capture and analyze audience sentiment, engagement, or emotional response in real time. The real-time audience feedback module may be configured to transmit aggregated crowd sentiment data (such as audience sentiment, engagement, or emotional response) to the subject(s) (who are physically located at a location different from the remote venue), such that the subject(s) may adapt their performance, or the crowd(s) at the one or more (other) remote venues may adapt their behavior(s), in response to the aggregated crowd sentiment data.

Figure 2B:
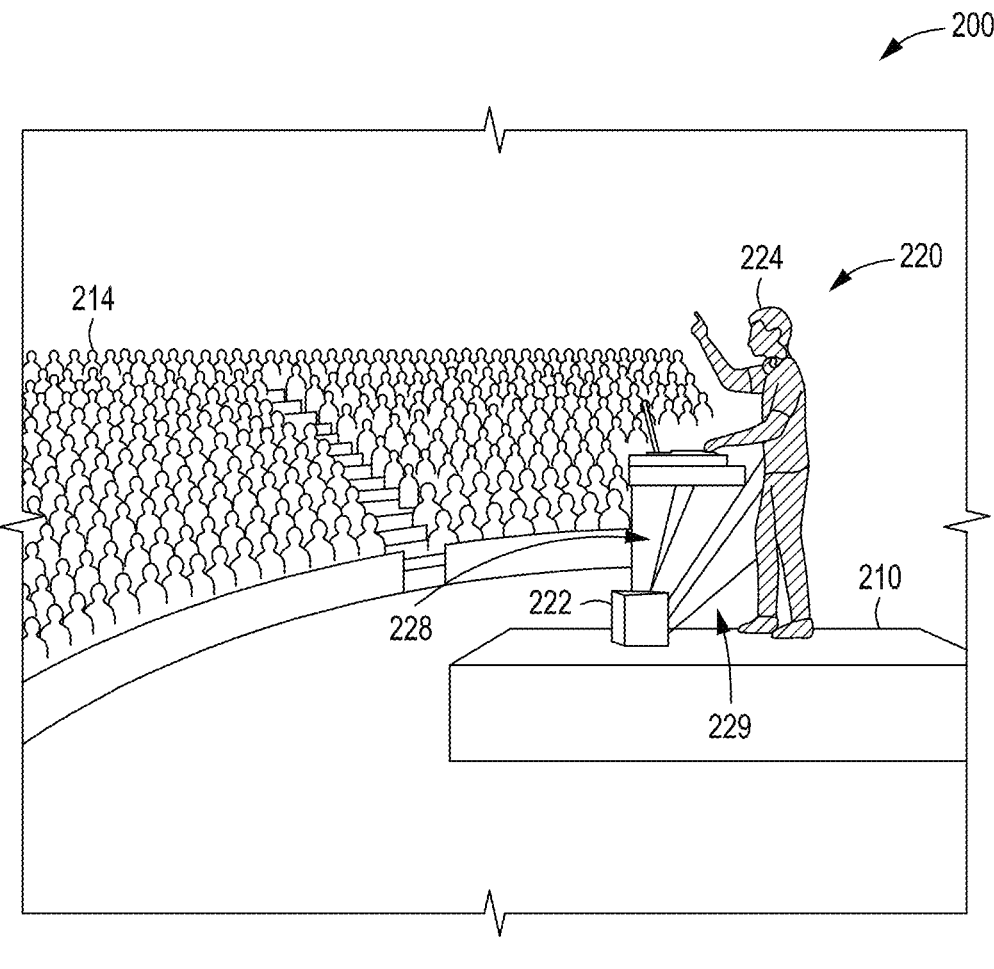
FIG. 2B is an illustration of an example of a side elevation view of the 360 degree visible holographic display system depicted in FIG. 2A, illustrating the depth and spatial arrangement of the holographic projection relative to the stage and audience.

FIG. 2B is an illustration of a side elevation view of the 360 degree visible holographic display system depicted in FIG. 2A, illustrating the depth and spatial arrangement of the holographic projection relative to the stage and audience.

FIG. 2B illustrates, by way of example, venue 200, stage 210, audience seating 214, LED volumetric array 222, hologram image 224, depth/offset indicator of hologram relative to stage/audience 228, and spacing between stage and display 229.

As shown in FIG. 2B, the remote venue 200 may features the stage 210, audience seating 214 (and audience 216 seated therein) arranged in a 360-degree configuration around the stage 210, the holographic display area or device 220, the LED volumetric array 222, and the hologram image 224 of FIG. 2A. Further depicted in FIG. 2B are a depth/offset indicator of the hologram relative to the stage/audience 228 and spacing between stage and display 229.

Figure 3:
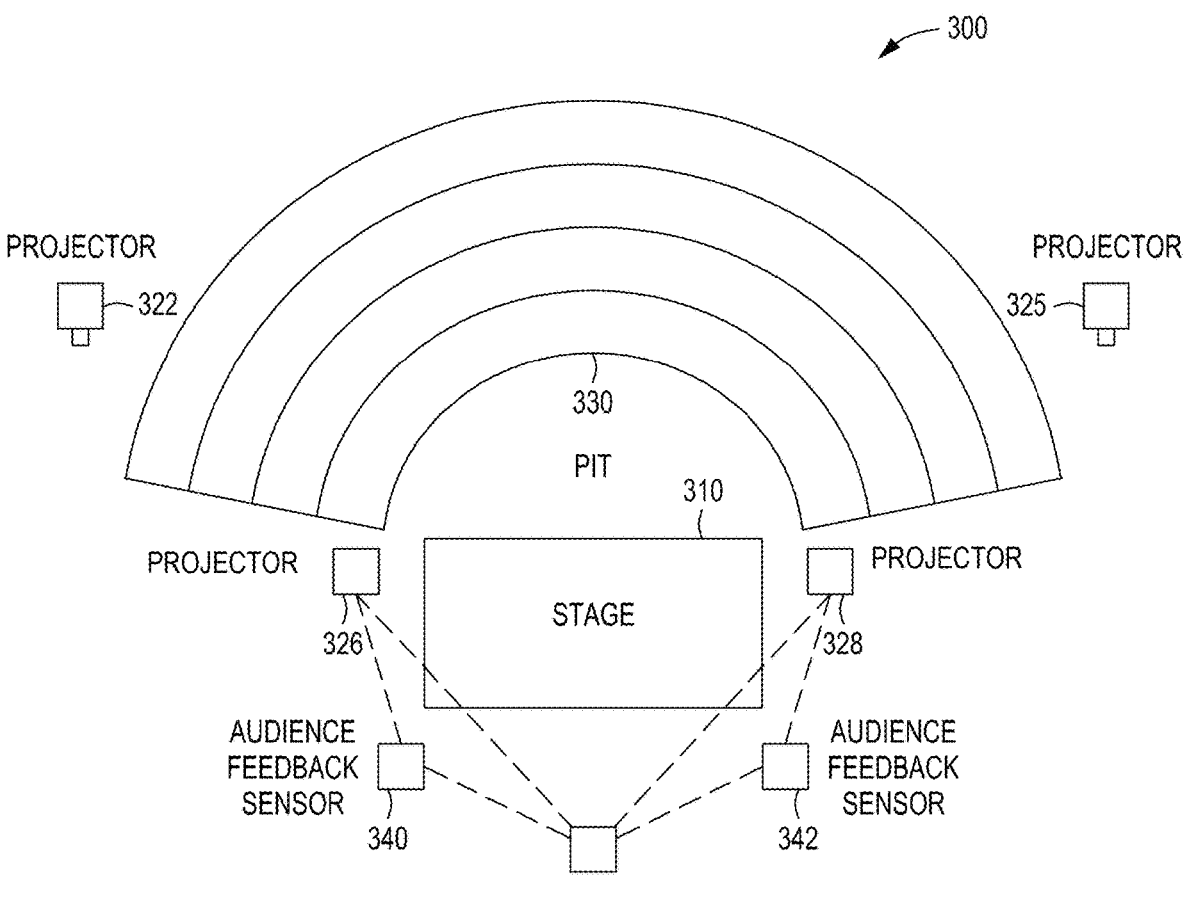
FIG. 3 is an illustration of a top plan view of a holographic display system for projecting a life-sized, three-dimensional subject on a stage at a remote venue, showing an example placement of the holographic projection system, stage, and audience feedback sensors.

FIG. 3 is an illustration of a top plan view of an example of a holographic display system for projecting a life-sized, three-dimensional subject on a stage at a remote venue, showing an example placement of the holographic projection system, stage, and audience feedback sensors.

FIG. 3 illustrates, by way of example, venue 300, stage 310, front left projector 322, front right projector 324, rear left projector 326, rear right projector 328, audience zone 330, left feedback sensor 340, and right feedback sensor 342.

As shown in FIG. 3, the remote venue 300 features a stage 310. An audience zone 330 for an audience is located in front of (above in FIG. 3) the stage. Surrounding the stage are front left projector 322, front right projector 324, rear left projector 326, and rear right projector 328. The front left, front right, rear left, and rear right projectors are configured to render volumetric data received by the remote venue from a low-latency module, such as a low-latency module described herein above or with respect to FIG. 4. The volumetric data may be rendered as a hologram image of a life-sized 3D subject. In the example shown, the hologram image is expected to be visible from multiple angles (e.g., from each angle in the audience zone). The remote venue further features a left feedback sensor 340 and a right feedback sensor 342. Each of the left and right feedback sensors may comprise computer vision cameras, microphone arrays, biometric sensors, or any possible combination thereof. The left and right feedback sensors may form part of a real-time audience feedback module, in combination with software. The real-time audience feedback module may be configured to capture crowd data and to transmit the crowd data back to the subject(s), who are not physically present at the remote venue, or to one or more (other) remote venues.

For instance, in some implementations, the crowd data can include sound data captured from at the one or more remote venues. In some examples, the crowd data can include movement or behavior of the audience captured by one or more image sensors at the one or more remote venues. In some examples, the crowd data can include lighting conditions captured by one or more image sensors at the one or more remote venues.

In some implementations, the real-time audience feedback module may include the left feedback sensor 340 and right feedback sensor 342 and configured to capture and analyze audience sentiment, engagement, or emotional response in real time. The real-time audience feedback module may be configured to transmit aggregated crowd sentiment data (such as audience sentiment, engagement, or emotional response) to the subject(s) (who are physically located at a location different from the remote venue), such that the subject(s) may adapt their performance, or the crowd(s) at the one or more (other) remote venues may adapt their behavior(s), in response to the aggregated crowd sentiment data.

Although depicted as using 4 projectors in FIG. 3, the remote venue may utilize any number of projectors. For instance, the remote venue may use at least about 2, 3, 4, 5, 6, 7, 8, 9, 10, 20, 30, 40, 50, 60, 70, 80, 90, 100, or more projectors, 100, 90, 80, 70, 60, 50, 40, 30, 20, 10, 9, 8, 7, 6, 5, 4, 3, or 2 projectors, or a number of projectors that is within a range defined by any two of the preceding values.

Although depicted as utilizing projectors in FIG. 3, the remote venue may utilize any holographic display devices described herein, such as holographic scrims, Pepper's Ghost systems, lenticular lenses, transparent LED screens, rear-projection foils, anamorphic displays, floating light-field technology, LED volumetric arrays, or any possible combination thereof. Generally, the holographic display devices are configured to render the subject as a spatially present hologram visible from multiple angles (in FIG. 3, from each angle in the audience zone).

Although FIG. 3 describes using the projectors to generate a single hologram of a single subject, the disclosure is not intended to be so limiting. For instance, at least about 2, 3, 4, 5, 6, 7, 8, 9, 10, 20, 30, 40, 50, 60, 70, 80, 90, 100, or more holograms, at most 100, 90, 80, 70, 60, 50, 40, 30, 20, 10, 9, 8, 7, 6, 5, 4, 3, or 2 holograms, or a number of holograms that is within a range defined by any two of the preceding values may be generated. The holograms may be associated with at least about 2, 3, 4, 5, 6, 7, 8, 9, 10, 20, 30, 40, 50, 60, 70, 80, 90, 100, or more subjects, at most about 100, 90, 80, 70, 60, 50, 40, 30, 20, 10, 9, 8, 7, 6, 5, 4, 3, or 2 subjects, or a number of subjects that is within a range defined by any two of the preceding values.

In some implementations, the remote venue may further comprise an audio system. The audio system may comprise a spatial audio system. The audio system may be synchronized with the holographic display device(s) and configured to provide positional audio corresponding to the subject(s)'s location(s) and movements. The audio system may comprise beamforming or object-based audio technology. The audio system may be configured to deliver positional audio that tracks a location of the hologram(s) within the remote venue.

Although depicted as utilizing 2 feedback sensors in FIG. 3, the remote venue may use any number of feedback sensors. For instance, the remote venue may utilize at least about 2, 3, 4, 5, 6, 7, 8, 9, 10, 20, 30, 40, 50, 60, 70, 80, 90, 100, or more feedback sensors, at most about 100, 90, 80, 70, 60, 50, 40, 30, 20, 10, 9, 8, 7, 6, 5, 3, or 2 feedback sensors, or a number of feedback sensors that is within a range defined by any two of the preceding values.

Any of the systems depicted in FIG. 1, 2A, 2B, or 3 may be configured to receive volumetric data that is encoded, compressed, and transmitted to the one or more remote venues by a low-latency streaming module (such as the low-latency streaming module described herein above or with respect to FIG. 4. In turn, the low-latency streaming module may be configured to encode, compress, and transmit volumetric data received from a volumetric capture rig (such as the volumetric capture rig described herein above or with respect to FIGS. 4 and 5), which is itself configured to capture volumetric data from the subject(s) in three dimensions in real time. Visual, audio, and interactive elements displayed at the remote venue may be synchronized with visual, audio, and interactive elements displayed at other remote venues using an orchestration layer. The orchestration layer may be configured to dynamically re-light the hologram to match lighting conditions at each of the one or more remote venues based on data from one or more lighting sensors at each remote venue.

Thus, disclosed herein are systems comprising: a) one or more holographic display devices located at each of one or more remote venues and configured to render volumetric data associated with one or more subjects as one or more holograms visible from multiple angles; b) optionally an audio system synchronized with the one or more holographic display devices and configured to provide positional audio corresponding to the one or more subjects' locations or movements; and c) a real-time audience feedback module comprising sensors and software configured to capture crowd data and to transmit the crowd data and to transmit the crowd data back to the one or more subjects or the one or more remote venues; wherein the volumetric data is captured using a volumetric capture rig; wherein the volumetric data is encoded, compressed, and transmitted to the one or more remote venues using a low-latency streaming module; wherein visual, audio, and interactive elements are synchronized across the one or more remote venues using an orchestration layer; and wherein the orchestration layer is further configured to dynamically re-light the hologram to match lighting conditions at each of the one or more remote venues based on data from one or more lighting sensors at each remote venue. The one or more holographic display devices may comprise any holographic display devices described herein above or with respect to FIG. 1, 2A, 2B, or 3. The one or more remote venues may comprise any remote venues described herein above or with respect to FIG. 1, 2A, 2B, or 3. The one or more subjects may comprise any subjects described herein above or with respect to FIG. 1, 2A, 2B, or 3. The holograms may comprise any holograms described herein above or with respect to FIG. 1, 2A, 2B, or 3. The audio system may comprise any audio system described herein above or with respect to FIG. 1, 2A, 2B, or 3. The real-time audience feedback module may comprise any real-time audience feedback module described herein above or with respect to FIG. 1, 2A, 2B, or 3. The sensors may comprise any sensors described herein above or with respect to FIG. 1, 2A, 2B, or 3. The software may comprise any software described herein above or with respect to FIG. 1, 2A, 2B, or 3. The volumetric capture rig may comprise any volumetric capture rig described herein above or with respect to FIG. 4, 5A, 5B, or 5C. The low-latency streaming module may comprise any low-latency streaming module described herein above or with respect to FIG. 4. The orchestration layer may comprise any orchestration layer described herein above or with respect to FIG. 4.

One or more examples of multi-venue systems for projecting a life-sized, three-dimensional subject on stages at multiple remote venues are described below.

Figure 4:
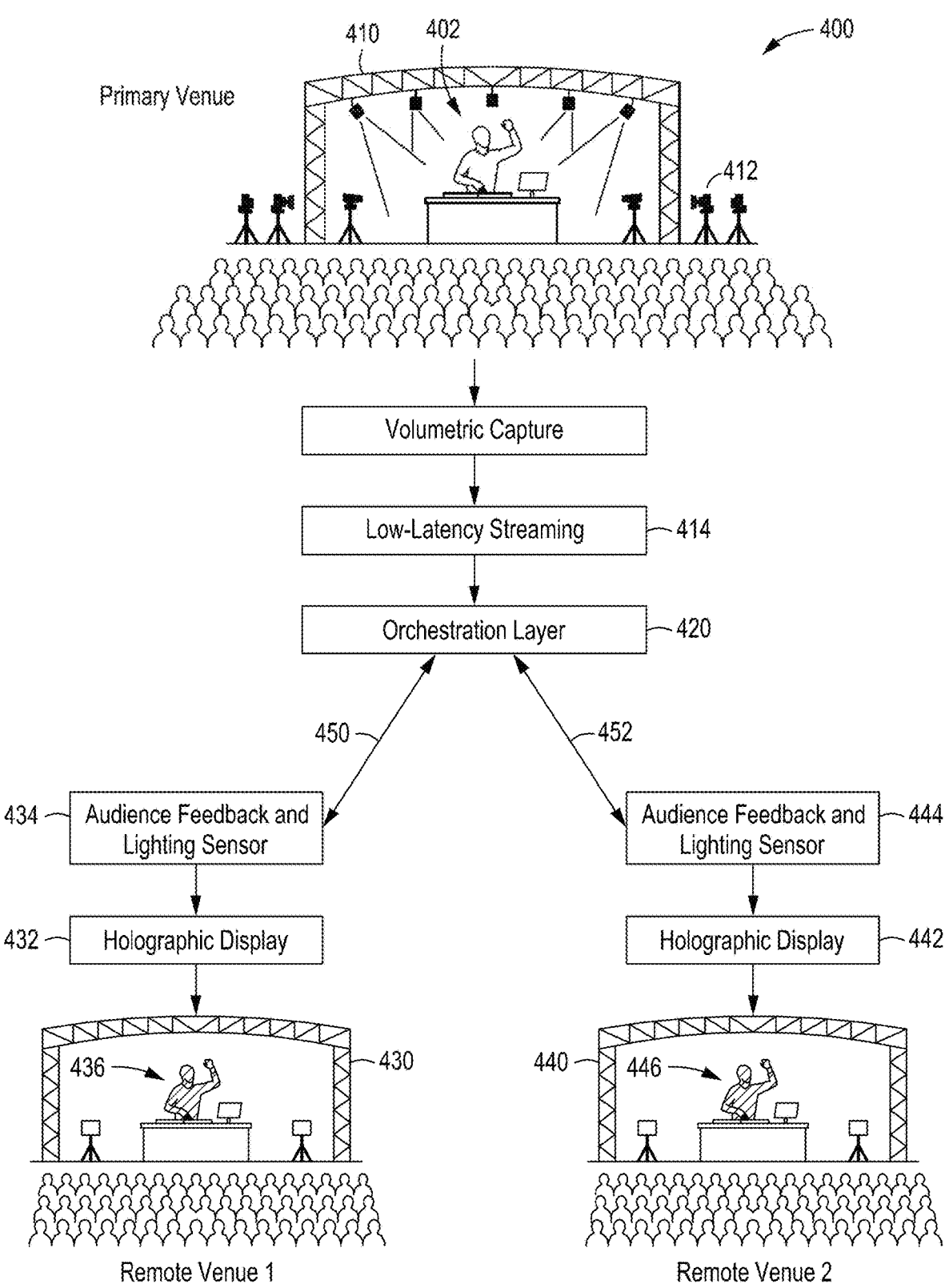
FIG. 4 is an illustration of a schematic view of a multi-venue system for projecting a life-sized, three-dimensional subject on stages at multiple remote venues, with networked connections to a central capture hub and synchronized remote venues.

FIG. 4 is an illustration of a schematic view of an example of a multi-venue system for projecting a life-sized, three-dimensional subject on stages at multiple remote venues, with networked connections to a central capture hub and synchronized remote venues.

FIG. 4 illustrates, by way of example, system 400, primary venue 410, volumetric capture rig 412, low-latency streaming module 414, orchestration layer 420, first remote venue 430, first remote holographic display 432, first remote audience feedback and lighting sensors 434, first hologram

436, second remote venue 440, second remote holographic display 442, second remote audience feedback and lighting sensors 444, second hologram 446, first network link to remote first venue 450, and second network link to second remote venue 452.

As shown in FIG. 4, certain components of the system 400 may be located at or in close proximity to a primary venue 410. That is, the primary venue may comprise a volumetric capture rig 412 and a low-latency streaming module 414.

The volumetric capture rig may be configured to capture volumetric data from a subject 402—that is present in real-life (non-hologram subject) in the primary venue 410—in three dimensions in real time. The volumetric capture rig may comprise a multi-camera array and a real-time 3D reconstruction software module. The volumetric capture rig may be configured to generate real-time, photorealistic 3D representations of the subject. For instance, the volumetric capture rig may be configured to represent the volumetric data using a collection of Gaussian splats, as described herein above. Each Gaussian splat may encode position, color, orientation, scale, and opacity to enable photorealistic rendering and dynamic re-lighting. The volumetric capture rig may be portable, and may be configured for rapid deployment, setup, and takedown in a variety of environments. Alternatively, the volumetric capture rig may be fixed in place at the primary venue.

The low-latency streaming module may be configured to encode, compress, and transmit the volumetric data (received from the volumetric capture rig) to one or more remote venues, such as a first remote venue 430 and a second remote venue 440. The low-latency streaming module may utilize edge computing resources, adaptive bitrate streaming, or volumetric codecs, such as those selected from the group consisting of: MPEG V-PCC, V-Nova VC6, and AV1 extensions. The low-latency streaming module may utilize network redundancy. The low-latency streaming module may utilize edge cloud infrastructure. The low-latency streaming module may be configured to maintain uninterrupted data transmission during network failures or congestion.

The system may further comprise an orchestration layer 420. The orchestration layer may be configured to synchronize visual, audio, and interactive elements across the remote venues (such as the first and second remote venues depicted in FIG. 4). The orchestration layer may be configured to adapt holographic projections at the remote venues (such as the first and second remote venues depicted in FIG. 4) to local venue lighting and environmental conditions associated with each of the remote venues by using camera systems to observe lighting at each remote venue and a software stack to re-light the 3D representation to match the local venue lighting and environmental conditions. The orchestration layer may comprise a multi-venue synchronization operating system. The multi-venue synchronization operating system may be configured to permit temporal and experiential unison across all of the remote venues (such as the first and second remote venues depicted in FIG. 4). The multi-venue synchronization operating system may be configured to synchronize interactive elements across all of the remote venues (such as the first and second remote venues depicted in FIG. 4). The orchestration layer may be configured to trigger remote lighting, audio, or visual effects in response to actions performed by the subject or audience feedback from the remote venues. The orchestration layer may be configured to dynamically re-light the hologram to match lighting conditions at each of the one or more remote venues based on data from one or more lighting sensors at each remote venue. The orchestration layer may comprise software located at or in proximity to the primary venue. Alternatively, the orchestration layer may comprise remote or cloud-based software. In some implementations, the orchestration layer 420 can include an electrical circuit, one or more processors, a controller, or the like, that can perform computer instructions corresponding to the software. The instructions may be stored in a non-volatile memory operationally connected to the one or more processors.

As shown in FIG. 4, certain components of the system may be located at or in close proximity to the first remote venue. That is, the first remote venue may comprise a first remote holographic display 432 and first remote audience feedback and lighting sensor 434. The first remote venue may communicate with the primary venue (or the orchestration layer) via a first network link 450 to the first remote venue.

The first remote holographic display may be configured to render the volumetric data as one or more holograms 436. The first remote holographic display may comprise any holographic display described herein above or with respect to FIG. 1, 2A, 2B, or 3B. The one or more holograms may be visible from multiple angles, such as any of the angles depicted herein with respect to FIG. 1, 2A, 2B, or 3.

The first remote audience feedback and lighting sensor may be a component of a first real-time audience feedback module which further comprises first software. The first real-time audience feedback module may be configured to capture crowd data (from the first remote venue) and to transmit the crowd data back to the subject or the one or more remote venues, as described herein above and with respect to FIGS. 1, 2A, 2B, and 3. The first real-time audience feedback module may comprise any real-time audience feedback module described herein with respect to FIG. 1, 2A, 2B, or 3.

In some implementations, the first remote venue may further comprise a first audio system. The first audio system may comprise a first spatial audio system. The first audio system may be synchronized with the first holographic display device and configured to provide positional audio corresponding to the subject's location and movements. The first audio system may comprise any audio system described herein above or with respect to FIG. 1, 2A, 2B, or 3.

As shown in FIG. 4, certain components of the system may be located at or in close proximity to the second remote venue. That is, the second remote venue may comprise a second remote holographic display 442 and second remote audience feedback and lighting sensor 444. The second remote venue may communicate with the primary venue (or the orchestration layer) via a second network link 452 to the second remote venue.

The second remote holographic display may be configured to render the volumetric data as one or more holograms 446. The second remote holographic display may comprise any holographic display described herein above or with respect to FIG. 1, 2A, 2B, or 3B. The one or more holograms may be visible from multiple angles, such as any of the angles depicted herein with respect to FIG. 1, 2A, 2B, or 3.

The second remote audience feedback and lighting sensor may be a component of a second real-time audience feedback module which further comprises second software. The second real-time audience feedback module may be configured to capture crowd data (from the second remote venue) and to transmit the crowd data back to the subject or the one or more remote venues, as described herein above and with respect to FIGS. 1, 2A, 2B, and 3. The second real-time audience feedback module may comprise any real-time audience feedback module described herein with respect to FIG. 1, 2A, 2B, or 3.

In some implementations, the second remote venue may further comprise a second audio system. The second audio system may comprise a second spatial audio system. The second audio system may be synchronized with the second holographic display device and configured to provide positional audio corresponding to the subject's location and movements. The second audio system may comprise any audio system described herein above or with respect to FIG. 1, 2A, 2B, or 3.

Although depicted as comprising two remote venues in FIG. 4, the system may comprise any number of remote venues, such as at least about 2, 3, 4, 5, 6, 7, 8, 9, 10, 20, 30, 40, 50, 60, 70, 80, 90, 100, or more remote venues, at most about 100, 90, 80, 70, 60, 50, 40, 30, 20, 10, 9, 8, 7, 6, 5, 4, 3, or 2 remote venues, or a number of remote venues that is within a range defined by any two of the preceding values.

Each remote venue may comprise any number or arrangement of holographic display devices and real-time audience feedback modules described herein above or with respect to FIG. 1, 2A, 2B, or 3. Each remote venue may display any number of holograms described herein above or with respect to FIG. 1, 2A, 2B, or 3.

One or more examples of Volumetric Capture Rig Systems are described below.

Figure 5A:
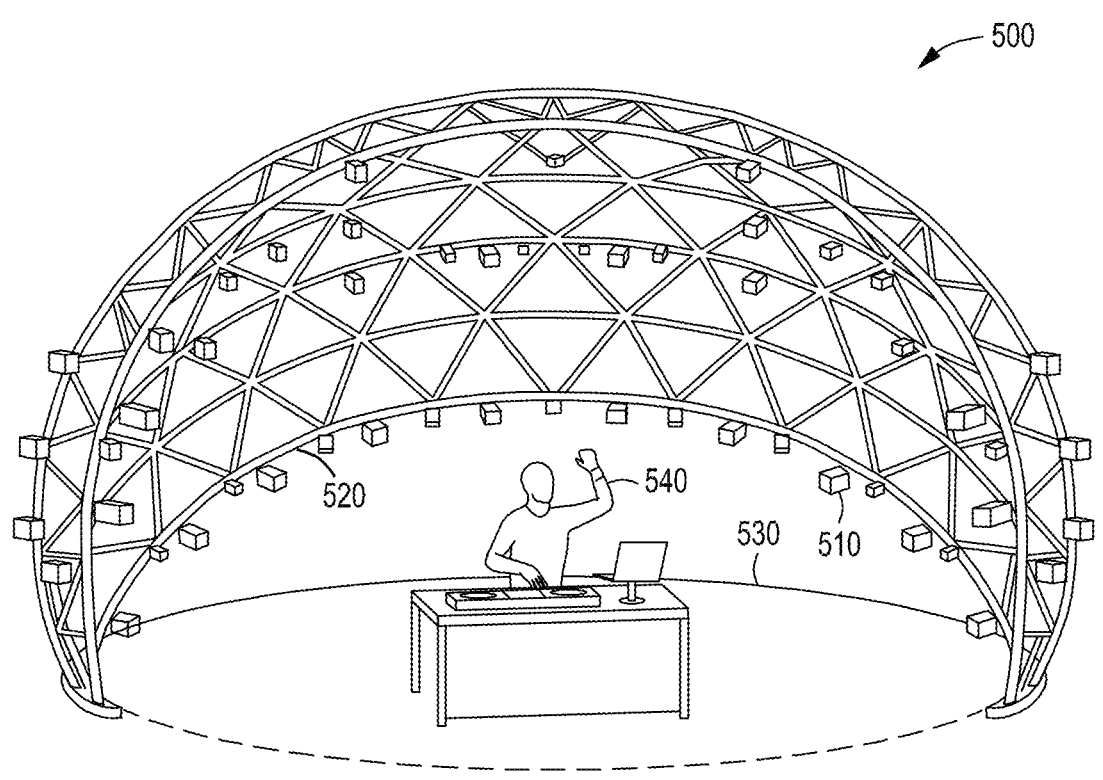
FIG. 5A is an illustration of an example of a volumetric capture rig to capture an in-person performance on a stage.

FIG. 5A is an illustration of an example of a volumetric capture rig to capture an in-person performance on a stage.

FIG. 5A illustrates, by way of example, volumetric capture rig 500, camera array 510, capture volume 520, stage/performance area 530, and one or more subjects 540. In FIG. 5A, the subject depicted is a performer.

As shown in FIG. 5A, the volumetric capture rig 500 comprises a camera array 510. The volumetric capture rig is configured to capture volumetric data of a capture volume 520. The capture volume comprises at least a portion of a stage/performance area 530, upon which a subject/performer 540 performs. Thus, the volumetric capture rig is configured to capture volumetric data of the subject in three dimensions in real time.

Figure 5B:
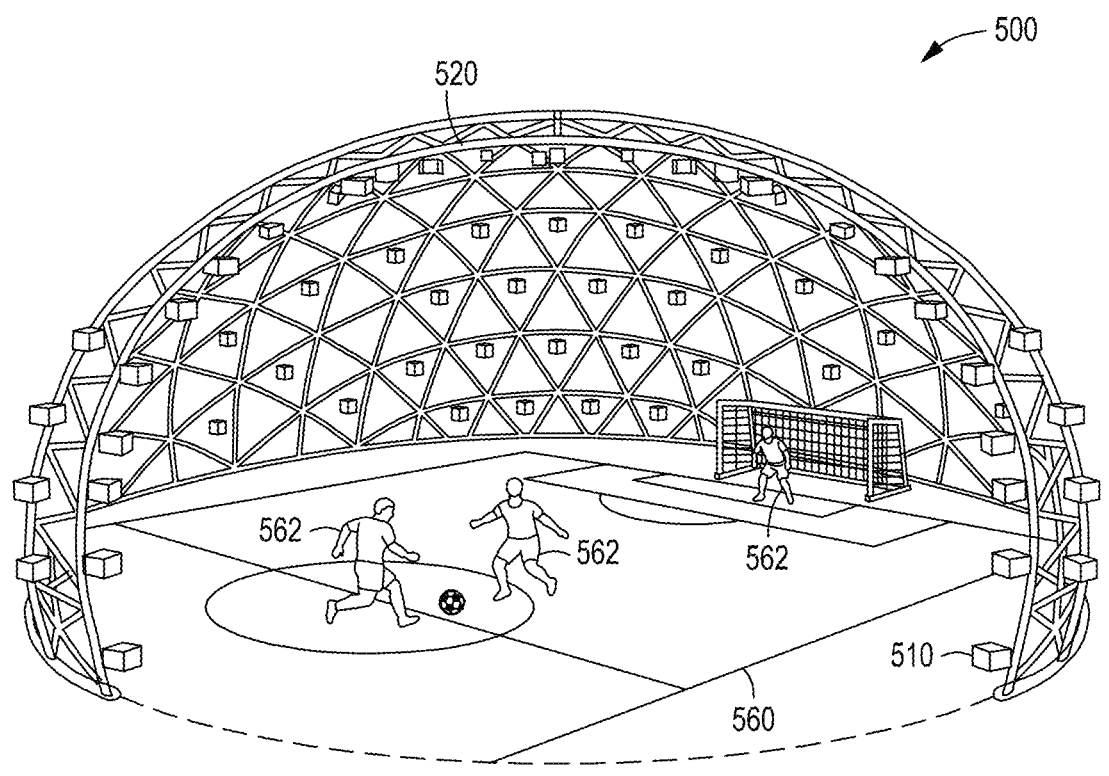
FIG. 5B is an illustration of an example of a volumetric capture rig to capture a live sports match.

FIG. 5B is an illustration of an example of a volumetric capture rig to capture a live sports match.

FIG. 5B illustrates, by way of example, volumetric capture rig 500, camera array 510, capture volume 520, playing surface/field/rink 560, and one or more subjects 562. In FIG. 5B, the subjects depicted are athletes.

As shown in FIG. 5B, the volumetric capture rig 500 comprises a camera array 510. The volumetric capture rig is configured to capture volumetric data of a capture volume 520. The capture volume comprises at least a portion of a playing surface/field/rink 560, upon which athletes 562 play.

Figure 5C:
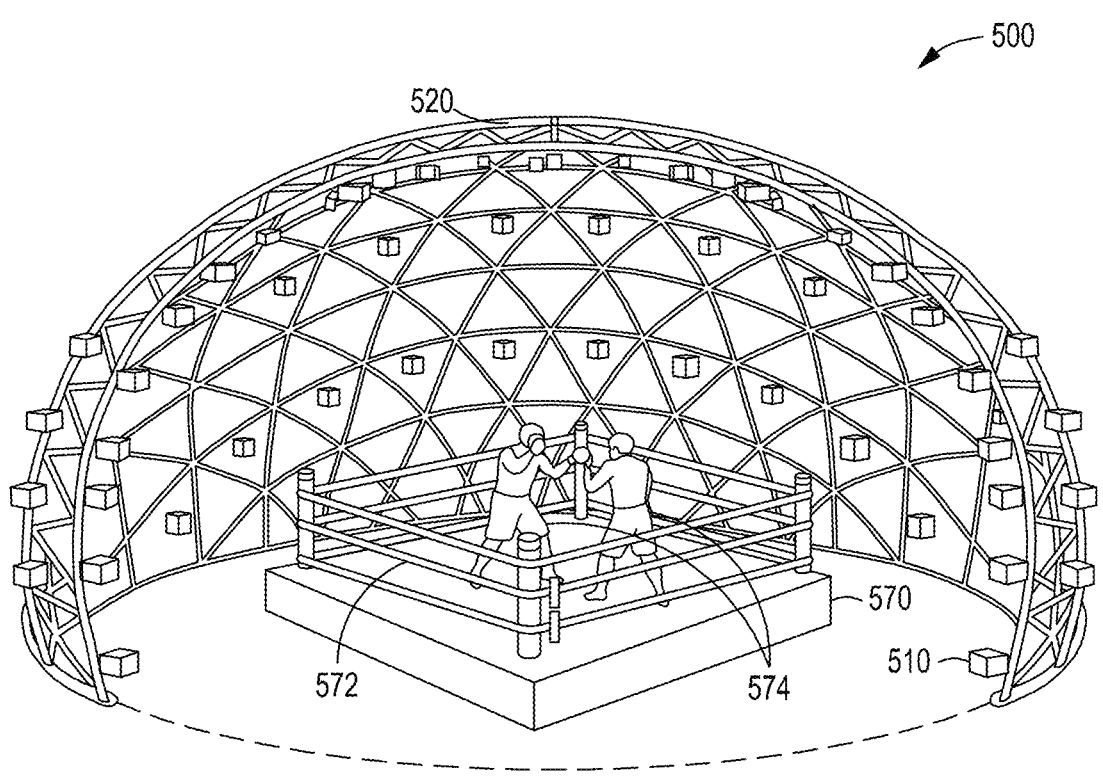
FIG. 5C is an illustration of an example of a volumetric capture rig to capture a live boxing match.

FIG. 5C is an illustration of an example of a volumetric capture rig to capture a live boxing match.

FIG. 5C illustrates, by way of example, volumetric capture rig 500, camera array 510, capture volume 520, boxing ring 570, ring ropes/stanchions 572, and one or more subjects 574. In FIG. 5C, the subjects depicted are boxers.

As shown in FIG. 5C, the volumetric capture rig 500 comprises a camera array 510. The volumetric capture rig is configured to capture volumetric data of a capture volume 520. The capture volume comprises at least a portion of a boxing ring 570, which comprises ring ropes/stanchions 572 and upon which boxers 574 box.

The volumetric capture rigs depicted in FIGS. 5A, 5B, and 5C may comprise any volumetric capture rig described herein above or with respect to FIG. 4. Each volumetric capture rig may be coupled with a low-latency streaming module. The low-latency streaming modules may be configured to encode, compress, and transmit the volumetric data to one or more remote venues.

The low-latency streaming modules may be coupled with an orchestration layer described herein above or with respect to FIG. 4. The orchestration layer may be configured to synchronize visual, audio, and interactive elements across the one or more remote venues, as described herein above or with respect to FIG. 4. The orchestration layer may be configured to dynamically re-light the hologram to match lighting conditions at each of the one or more remote venues based on data from one or more lighting sensors at each remote venue. The orchestration layer may comprise local software in proximity to the volumetric capture rig. Alternatively, the orchestration layer may comprise remote or cloud-based software.

Although FIGS. 5A, 5B, and 5C depict a single subject, three subjects, and two subjects, respectively, the disclosure is not intended to be so limiting. For instance, at least about 1, 2, 3, 4, 5, 6, 7, 8, 9, 10, 20, 30, 40, 50, 60, 70, 80, 90, 100, or more subjects, at most 100, 90, 80, 70, 60, 50, 40, 30, 20, 10, 9, 8, 7, 6, 5, 4, 3, 2, or 1 subjects, or a number of subjects that is within a range defined by any two of the preceding values may be volumetrically captured.

One or more holographic display devices may be located at each of the one or more remote venues and may be configured to render the volumetric data as one or more holograms visible from multiple angles, as described herein above or with respect to FIG. 1, 2A, 2B, 3, or 4. The one or more holographic display devices may comprise any number or type holographic display devices described herein above or with respect to FIG. 1, 2A, 2B, 3, or 4.

The one or more remote venues may each feature a real-time audience feedback module comprising sensors and software configured to capture crowd data and to transmit the crowd data back to the one or more subjects or the one or more remote venues. The real-time audience feedback modules may comprise any number or type of audience feedback modules described herein above or with respect to FIG. 1, 2A, 2B, 3, or 4.

The one or more remote venues may each feature an audio system, such as a spatial audio system. The audio system may comprise any audio system described herein above or with respect to FIG. 1, 2A, 2B, 3, or 4.

Thus, disclosed herein are systems comprising: a) a volumetric capture rig configured to capture volumetric data from one or more subjects in three dimensions in real time; and b) a low-latency streaming module configured to encode, compress, and transmit the volumetric data to one or more remote venues; wherein one or more holographic display devices are located at each of the one or more remote venues and configured to render the volumetric data as one or more holograms visible from multiple angles; wherein optionally an audio system is synchronized with the one or more holographic display devices and configured to provide positional audio corresponding to the one or more subjects' locations or movements; wherein a real-time audience feedback module comprising sensors and software is configured to capture crowd data and to transmit the crowd data back to the one or more subjects or the one or more remote venues; wherein an orchestration layer is configured to synchronize visual, audio, and interactive elements across the one or more remote venues; and wherein the orchestration layer is further configured to dynamically re-light the hologram to match lighting conditions at each of the one or more remote venues based on data from one or more lighting sensors at each remote venue.

The volumetric capture rig may comprise any volumetric capture rig described herein above or with respect to FIG. 4, 5A, 5B, or 5C. The low-latency streaming module may comprise any low-latency streaming module described herein above or with respect to FIG. 4. The one or more holographic display devices may comprise any holographic display devices described herein above or with respect to FIG. 1, 2A, 2B, or 3. The one or more remote venues may comprise any remote venues described herein above or with respect to FIG. 1, 2A, 2B, or 3. The one or more subjects may comprise any subjects described herein above or with respect to FIG. 1, 2A, 2B, or 3. The holograms may comprise any holograms described herein above or with respect to FIG. 1, 2A, 2B, or 3. The audio system may comprise any audio system described herein above or with respect to FIG. 1, 2A, 2B, or 3. The real-time audience feedback module may comprise any real-time audience feedback module described herein above or with respect to FIG. 1, 2A, 2B, or 3. The sensors may comprise any sensors described herein above or with respect to FIG. 1, 2A, 2B, or 3. The software may comprise any software described herein above or with respect to FIG. 1, 2A, 2B, or 3. The orchestration layer may comprise any orchestration layer described herein above or with respect to FIG. 4.

One or more example methods for operating the system are described below.

Figure 6:
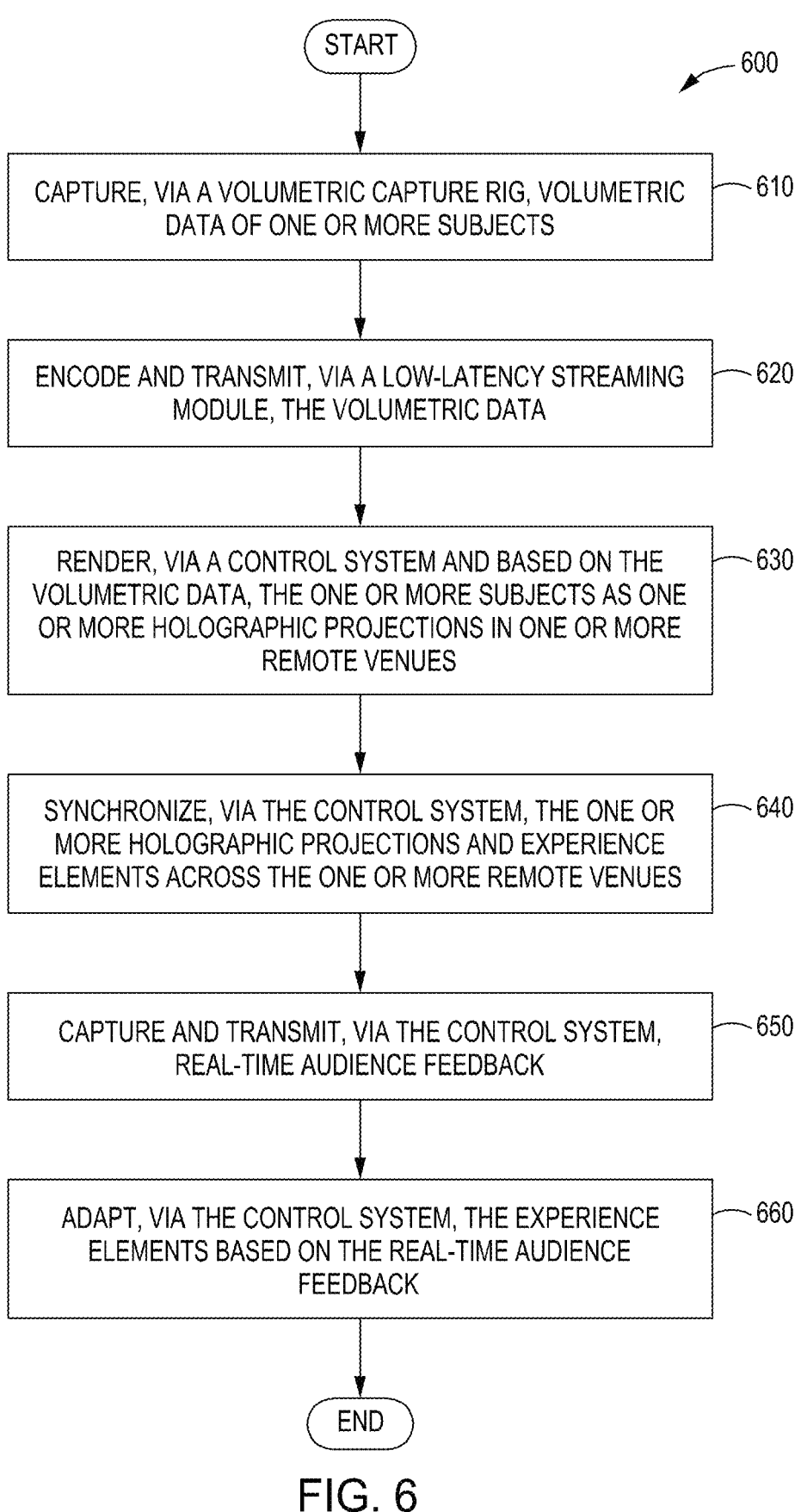
FIG. 6 is an illustration of an example of a method for delivering a real-time volumetric holographic rendering.

FIG. 6 is an illustration of an example method 600 for delivering a real-time volumetric holographic rendering. At 610, volumetric data of one or more subjects is captured via a volumetric capture rig. The one or more subjects may comprise any one or more subjects described herein above or with respect to FIG. 1, 2A, 2B, 3, 4, 5A, 5B, or 5C. The volumetric capture rig may comprise any volumetric capture rig described herein above or with respect to FIG. 4, 5A, 5B, or 5C. The volumetric data may comprise any volumetric data described herein with respect to FIG. 4, 5A, 5B, or 5C.

At 620, the volumetric data is encoded and transmitted via a low-latency streaming module. The low-latency streaming module may comprise any low-latency streaming module described herein above or with respect to FIG. 4.

At 630, the one or more subjects are rendered as one or more holographic projections in one or more remote venues. The rendering may be achieved via a control system. The one or more subjects may comprise any one or more subjects described herein above or with respect to FIG. 1, 2A, 2B, 3, 4, 5A, 5B, or 5C. The one or more remote venues may comprise any remote venues described herein above or with respect to FIG. 1, 2A, 2B, 3, or 4. The rendering may comprise dynamically re-lighting the one or more holographic projections to match lighting conditions at each remote venue based on data from one or more lighting sensors at each remote venue. The one or more lighting sensors may comprise any lighting sensors described herein above or with respect to FIG. 1, 2A, 2B, 3, or 4.

At 640, the one or more holographic projections (or experience elements) are synchronized via the control system. The synchronization may be achieved via the control system.

At 650, real-time audience feedback is captured and transmitted. The real-time audience feedback may be captured using any real-time audience feedback module described herein above or with respect to FIG. 1, 2A, 2B, 3, or 4. The capture and transmission may be achieved using the control system.

At 660, the experience elements are adapted based on the real-time audience feedback. The adaptation may be achieved using the control system.

In some implementations, the method further comprises enabling real-time interactions between the one or more subjects and one or more remote audiences at the one or more remote venues. The real-time interactions may be transmitted bidirectionally In some implementations, the method further comprises delivering simultaneous experiences to underserved or geographically distant markets by minimizing latency to thereby preserve the sense of live presence.

In some implementations, the method further comprises adapting lighting and visual effects in each of the one or more remote venues based on local environmental conditions associated with each of the one or more remote venues. The adaptation may be achieved using an orchestration layer that dynamically adjusts the holographic projection.

In some implementations, the method further comprises collecting and analyzing biometric and behavioral data from audiences, wherein the data is used to adapt the experience in real time.

In some implementations, the method further comprises providing a feedback loop wherein aggregated audience reactions influence the live experience, and wherein the control system adapts experience elements in response to the real-time audience feedback.

Figure 7:
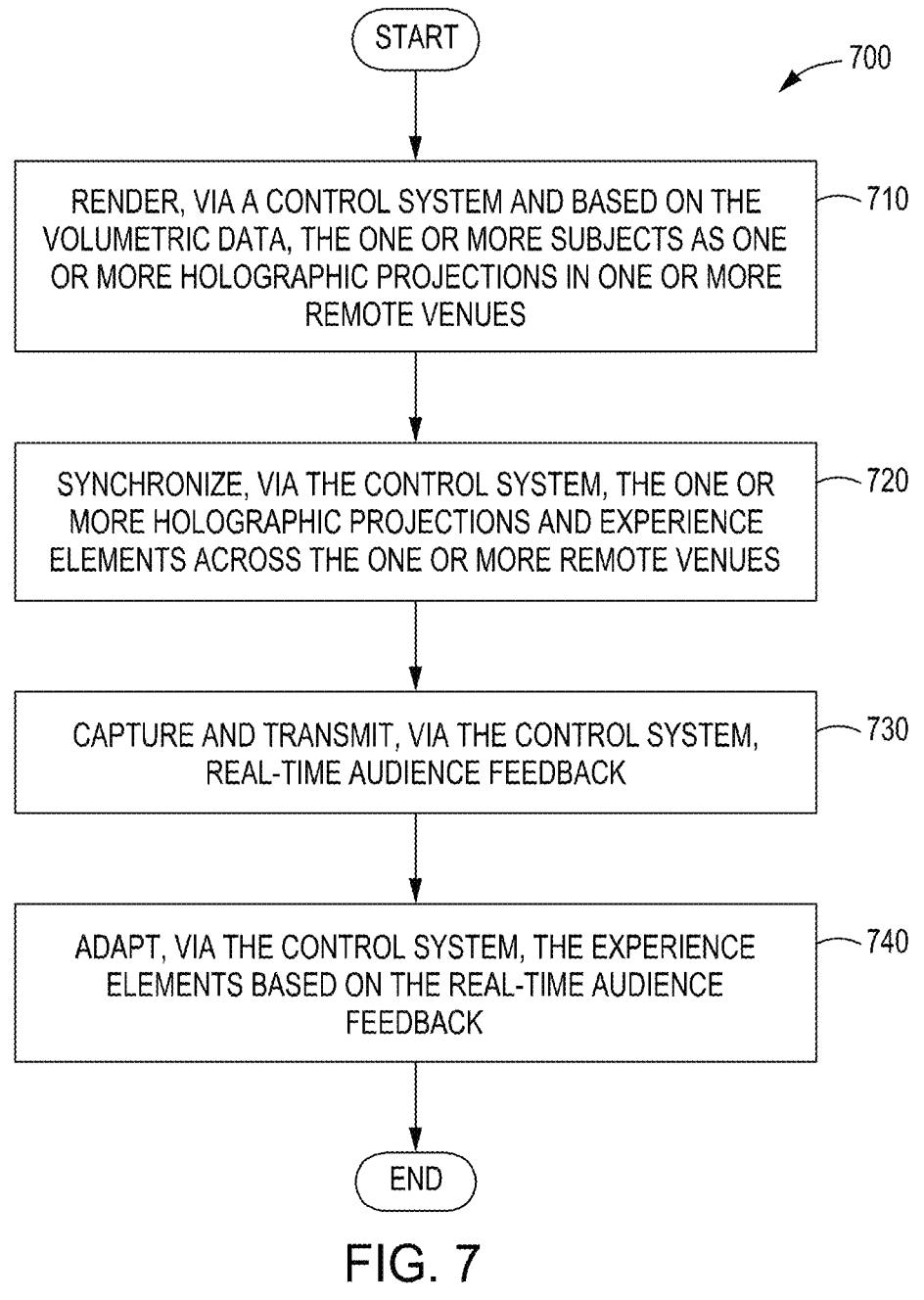
FIG. 7 is an illustration of an example of a method for receiving and displaying a real-time volumetric holographic rendering at remote venues.

FIG. 7 is an illustration of an example method 700 for receiving and displaying a real-time volumetric holographic rendering at remote venues. At 710, one or more subjects are rendered as one or more holographic projections in one or more remote venues. The rendering may be achieved via a control system. The one or more subjects may comprise any one or more subjects described herein above or with respect to FIG. 1, 2A, 2B, 3, 4, 5A, 5B, or 5C. The one or more remote venues may comprise any remote venues described herein above or with respect to FIG. 1, 2A, 2B, 3, or 4. The rendering may comprise dynamically re-lighting the one or more holographic projections to match lighting conditions at each remote venue based on data from one or more lighting sensors at each remote venue. The one or more lighting sensors may comprise any lighting sensors described herein above or with respect to FIG. 1, 2A, 2B, 3, or 4.

At 720, the one or more holographic projections (or experience elements) are synchronized via the control system. The synchronization may be achieved via the control system.

At 730, real-time audience feedback is captured and transmitted. The real-time audience feedback may be captured using any real-time audience feedback module described herein above or with respect to FIG. 1, 2A, 2B, 3, or 4. The capture and transmission may be achieved using the control system.

At 740, the experience elements are adapted based on the real-time audience feedback. The adaptation may be achieved using the control system.

The volumetric data may be encoded and transmitted (e.g., at a different location from the remote venues) prior to the rendering. The volumetric data may be encoded and transmitted via a low-latency streaming module. The low-latency streaming module may comprise any low-latency streaming module described herein above or with respect to FIG. 4. In turn, the volumetric data received by the low-latency streaming module may be captured via a volumetric capture rig. The volumetric capture rig may comprise any volumetric capture rig described herein above or with respect to FIG. 4, 5A, 5B, or 5C.

Method 700 may comprise any additional operations described herein above or with respect to FIG. 6.

Thus, disclosed herein are methods comprising: a) rendering, via a control system and based on volumetric data, one or more subjects as one or more holographic projections in one or more remote venues, wherein the rendering comprises dynamically re-lighting the one or more holographic projections to match lighting conditions at each remote venue based on data from one or more lighting sensors at each remote venue; b) synchronizing, via the control system, the one or more holographic projections and experience elements across the one or more remote venues; c) capturing and transmitting, via the control system, real-time audience feedback; and d) adapting, via the control system, the experience elements based on the real-time audience feedback; wherein the volumetric data of the one or more subjects is captured via a volumetric capture rig; and wherein the volumetric data is encoded and transmitted via a low-latency streaming module.

The one or more remote venues may comprise any remote venues described herein above or with respect to FIG. 1, 2A, 2B, or 3. The one or more subjects may comprise any subjects described herein above or with respect to FIG. 1, 2A, 2B, or 3. The one or more holographic projections may comprise any holograms described herein above or with respect to FIG. 1, 2A, 2B, or 3. The real-time audience feedback may be captured using any real-time audience feedback module described herein above or with respect to FIG. 1, 2A, 2B, or 3. The volumetric capture rig may comprise any volumetric capture rig described herein above or with respect to FIG. 4, 5A, 5B, or 5C. The low-latency streaming module may comprise any low-latency streaming module described herein above or with respect to FIG. 4.

Figure 8:
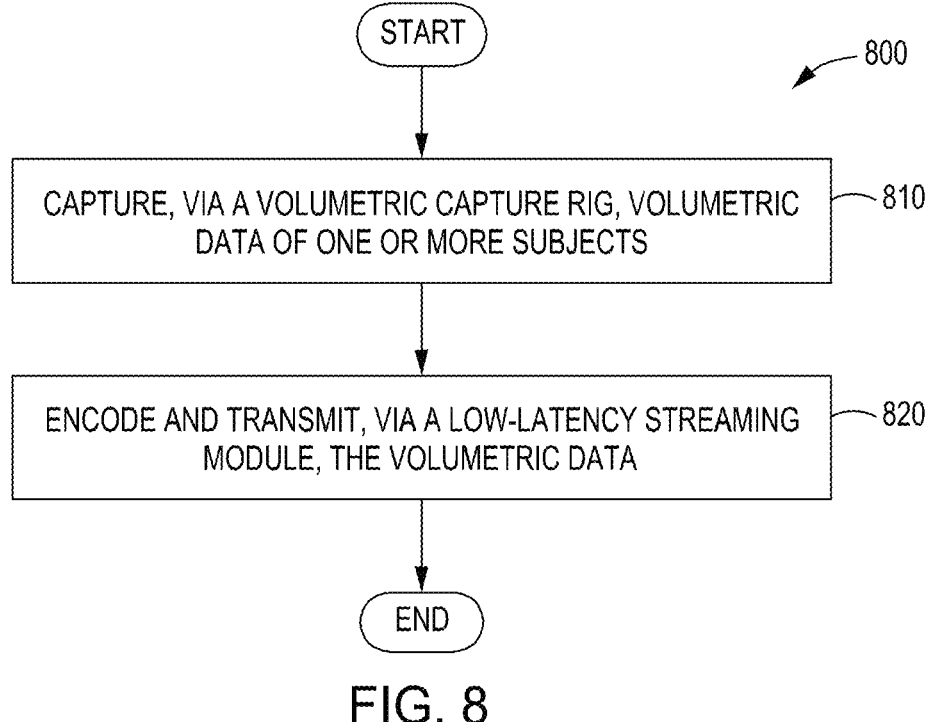
FIG. 8 is an illustration of an example of a method for generating and transmitting volumetric data for use in holographic renderings at remote venues.

FIG. 8 is an illustration of an example method 800 for generating and transmitting volumetric data for use in holographic renderings at remote venues.

At 810, volumetric data of one or more subjects is captured via a volumetric capture rig. The volumetric capture rig may comprise any volumetric capture rig described herein above or with respect to FIG. 4, 5A, 5B, or 5C. The one or more subjects may comprise any one or more subjects described herein above or with respect to FIG. 1, 2A, 2B, 3, 4, 5A, 5B, or 5C.

At 820, the volumetric data are encoded and transmitted via a low-latency streaming module. The low-latency streaming module may comprise any low-latency streaming module described herein above or with respect to FIG. 4.

Following transmission, the one or more subjects may be rendered as one or more holographic projects in the one or more remote venues. The rendering may be achieved via a control system. The one or more subjects may comprise any one or more subjects described herein above or with respect to FIG. 1, 2A, 2B, 3, 4, 5A, 5B, or 5C. The one or more remote venues may comprise any remote venues described herein above or with respect to FIG. 1, 2A, 2B, 3, or 4. The rendering may comprise dynamically re-lighting the one or more holographic projections to match lighting conditions at each remote venue based on data from one or more lighting sensors at each remote venue. The one or more lighting sensors may comprise any lighting sensors described herein above or with respect to FIG. 1, 2A, 2B, 3, or 4.

The one or more holographic projections (or experience elements) may be synchronized at each of the remote venues via the control system. The synchronization may be achieved via the control system.

Real-time audience feedback may be captured and transmitted at each of the remote venues. The real-time audience feedback may be captured using any real-time audience feedback module described herein above or with respect to FIG. 1, 2A, 2B, 3, or 4. The capture and transmission may be achieved using the control system.

The experience elements may adapted based on the real-time audience feedback at each of the remote venues. The adaptation may be achieved using the control system.

Method 800 may comprise any additional operations described herein above or with respect to FIG. 6.

Thus, disclosed herein are methods comprising: a) capturing, via a volumetric capture rig, volumetric data of one or more subjects; and b) encoding and transmitting, via a low-latency streaming module, the volumetric data; wherein the one or more subjects are rendered as one or more holographic projections in one or more remote venues via a control system, wherein the rendering comprises dynamically re-lighting the one or more holographic projections to match lighting conditions at each remote venue based on data from one or more lighting sensors at each remote venue; wherein the one or more holographic projections and experience elements are synchronized across the one or more remote venues via the control system; wherein real-time audience feedback is captured and transmitted via the control system; and wherein the experience elements are adapted based on the real-time audience feedback via the control system.

The one or more subjects may comprise any subjects described herein above or with respect to FIG. 1, 2A, 2B, or 3. The volumetric capture rig may comprise any volumetric capture rig described herein above or with respect to FIG. 4, 5A, 5B, or 5C. The low-latency streaming module may comprise any low-latency streaming module described herein above or with respect to FIG. 4. The one or more holographic projections may comprise any holograms described herein above or with respect to FIG. 1, 2A, 2B, or 3. The real-time audience feedback may be captured using any real-time audience feedback module described herein above or with respect to FIG. 1, 2A, 2B, or 3.

In some implementations, a real-time volumetrically captured, holographically projected experience low-latency streaming system includes: a. a volumetric capture rig configured to capture volumetric data from one or more subjects in three dimensions in real time; b. a low-latency streaming module configured to encode, compress, and transmit the volumetric data to one or more remote venues; c. one or more holographic display devices located at each of the one or more remote venues and configured to render the volumetric data as one or more holograms visible from multiple angles; d. an audio system synchronized with the one or more holographic display devices to provide audio corresponding to the one or more subjects' locations and movement; e. a real-time audience feedback module comprising sensors and software configured to capture crowd data and to transmit the crowd data back to the one or more subjects or the one or more remote venues; and f. an orchestration layer configured to synchronize visual, audio, and interactive elements across the one or more remote venues; wherein the orchestration layer is further configured to dynamically re-light the hologram to match lighting conditions at each of the one or more remote venues based on data from one or more lighting sensors at each remote venue.

In some implementations, the volumetric capture rig comprises a multi-camera array and a real-time 3D reconstruction software module and is configured to generate real-time, photorealistic 3D representations of the one or more subjects.

In some implementations, the low-latency streaming module utilizes edge computing resources, adaptive bitrate streaming, or volumetric codecs selected from the group consisting of: MPEG V-PCC, V-Nova VC6, and AV1 extensions.

In some implementations, the one or more holographic display devices are selected from the group consisting of: holographic scrims, Pepper's Ghost systems, lenticular lenses, transparent LED screens, rear-projection foils, anamorphic displays, floating light-field technology, LED volumetric arrays, or combinations thereof, and wherein the one or more holographic display devices are configured to render the one or more subjects as one or more spatially present holograms visible from multiple angles.

In some implementations, the orchestration layer is configured to adapt the one or more holographic projections to local venue lighting and environmental conditions associated with each of the one or more remote venues by using camera systems to observe lighting at each remote venue and a software stack to re-light the 3D representation to match the local venue lighting and environmental conditions.

In some implementations, the orchestration layer further comprises a multi-venue synchronization operating system and wherein the multi-venue synchronization operating system is configured to permit temporal and experiential unison across all of the one or more remote venues.

In some implementations, the real-time audience feedback module comprises computer vision cameras, microphone arrays, and biometric sensors, and is configured to capture and analyze audience sentiment, engagement, and emotional response in real time.

In some implementations, the orchestration layer is further configured to trigger remote lighting, audio, and visual effects in response to actions performed by the one or more subjects or audience feedback.

In some implementations, the audio system comprises a spatial audio system synchronized with the one or more holographic display devices to provide spatial audio corresponding to the one or more subjects' locations and movement.

In some implementations, the spatial audio system comprises beamforming or object-based audio technology and is configured to deliver positional audio that tracks the location of the hologram within each venue.

In some implementations, the volumetric capture rig is portable, and is configured for rapid deployment, setup, and takedown in a variety of environments.

In some implementations, the low-latency streaming module further utilizes network redundancy edge cloud infrastructure and is configured to maintain uninterrupted data transmission during network failures or congestion.

In some implementations, the real-time audience feedback module is further configured to transmit aggregated crowd sentiment data to the one or more subjects or to the one or more remote venues in real-time such that the one or more subjects may adapt the performance or crowds at the one or more remote venues may adapt their behavior in response to the aggregated crowd sentiment data.

In some implementations, the multi-venue synchronization operating system is further configured to synchronize interactive elements across the one or more remote venues.

In some implementations, the volumetric capture rig is configured to represent the volumetric data using a collection of Gaussian splats, each Gaussian splat encoding position, color, orientation, scale, and opacity to enable photorealistic rendering and dynamic re-lighting.

According to another aspect, a method for delivering a real-time volumetric holographic rendering includes capturing, via a volumetric capture rig, volumetric data of one or more subjects; encoding and transmitting, via a low-latency streaming module, the volumetric data; rendering, via a control system and based on the volumetric data, the one or more subjects as one or more holographic projections in one or more remote venues, wherein the rendering comprises dynamically re-lighting the one or more holographic projections to match lighting conditions at each remote venue based on data from one or more lighting sensors at each remote venue; synchronizing, via the control system, the one or more holographic projections and experience elements across the one or more remote venues; capturing and transmitting, via the control system, real-time audience feedback; and adapting, via the control system, the experience elements based on the real-time audience feedback.

In some implementations, the method further includes enabling real-time interactions between the one or more sand one or more remote audiences at the one or more remote venues, wherein the real-time interactions are transmitted bidirectionally.

In some implementations, the method further includes delivering simultaneous experiences to underserved or geographically distant markets by minimizing latency to thereby preserve the sense of live presence.

In some implementations, the method further includes adapting lighting and visual effects in each of the one or more remote venues based on local environmental conditions associated with each of the one or more remote venues by dynamically adjusting the holographic projection.

In some implementations, the method further includes ensuring temporal alignment of show elements across the one or more remote venues, wherein the multi-venue synchronization operating system coordinates timing and effects.

In some implementations, the method further includes collecting and analyzing biometric and behavioral data from one or more audiences at the one or more remote venues, wherein the data is used to adapt the experience in real time.

In some implementations, the method further includes providing a feedback loop wherein aggregated audience reactions influence the live experience of each audience at the one or more remote venues, and wherein the control system further adapts experience elements in response to the real-time audience feedback.

In some implementations, the volumetric data is represented using a collection of Gaussian splats, each Gaussian splat encoding position, color, orientation, scale, and opacity to enable photorealistic rendering and dynamic re-lighting.

According to another aspect. a real-time volumetrically captured, holographically projected experience low-latency streaming system includes a. one or more holographic display devices located at each of one or more remote venues and configured to render volumetric data from one or more subjects as one or more holograms visible from multiple angles; b. an audio system synchronized with the one or more holographic display devices to provide audio corresponding to the one or more subjects' locations and movement; and c. a real-time audience feedback module comprising sensors and software configured to capture crowd data and to transmit the crowd data back to the one or more subjects or the one or more remote venues. The volumetric data is captured in real time using a volumetric capture rig, the volumetric data is encoded, compressed, and transmitted to the one or more remote venues using a low-latency streaming module, visual, audio, and interactive elements are synchronized across the one or more remote venues using an orchestration layer, and the orchestration layer is further configured to dynamically re-light the hologram to match lighting conditions at each of the one or more remote venues based on data from one or more lighting sensors at each remote venue.

In some implementations, the volumetric capture rig comprises a multi-camera array and a real-time 3D reconstruction software module and is configured to generate real-time, photorealistic 3D representations of the one or more subjects.

In some implementations, the low-latency streaming module utilizes edge computing resources, adaptive bitrate streaming, or volumetric codecs selected from the group consisting of: MPEG V-PCC, V-Nova VC6, and AV1 extensions.

In some implementations, the one or more holographic display devices are selected from the group consisting of: holographic scrims, Pepper's Ghost systems, lenticular lenses, transparent LED screens, rear-projection foils, anamorphic displays, floating light-field technology, LED volumetric arrays, or combinations thereof, and wherein the one or more holographic display devices are configured to render the one or more subjects as one or more spatially present holograms visible from multiple angles.

In some implementations, the orchestration layer is configured to adapt the one or more holographic projections to local venue lighting and environmental conditions associated with each of the one or more remote venues by using camera systems to observe lighting at each remote venue and a software stack to re-light the 3D representation to match the local venue lighting and environmental conditions.

In some implementations, the orchestration layer further comprises a multi-venue synchronization operating system and wherein the multi-venue synchronization operating system is configured to permit temporal and experiential unison across all of the one or more remote venues.

In some implementations, the real-time audience feedback module comprises computer vision cameras, microphone arrays, and biometric sensors, and is configured to capture and analyze audience sentiment, engagement, and emotional response in real time.

In some implementations, the orchestration layer is further configured to trigger remote lighting, audio, and visual effects in response to actions performed by the one or more subjects or audience feedback.

In some implementations, the audio system comprises a spatial audio system synchronized with the one or more holographic display devices to provide spatial audio corresponding to the one or more subjects' locations and movement.

In some implementations, the spatial audio system comprises beamforming or object-based audio technology and is configured to deliver positional audio that tracks the location of the hologram within each venue.

In some implementations, the volumetric capture rig is portable, and is configured for rapid deployment, setup, and takedown in a variety of environments.

In some implementations, the low-latency streaming module further utilizes network redundancy edge cloud infrastructure and is configured to maintain uninterrupted data transmission during network failures or congestion.

In some implementations, the real-time audience feedback module is further configured to transmit aggregated crowd sentiment data to the one or more subjects or to the one or more remote venues in real-time such that the one or more subjects may adapt the performance or crowds at the one or more remote venues may adapt their behavior in response to the aggregated crowd sentiment data.

In some implementations, the multi-venue synchronization operating system is further configured to synchronize interactive elements across the one or more remote venues.

In some implementations, the volumetric capture rig is configured to represent the volumetric data using a collection of Gaussian splats, each Gaussian splat encoding position, color, orientation, scale, and opacity to enable photorealistic rendering and dynamic re-lighting.

According to another aspect, a method for delivering a real-time volumetric holographic rendering includes rendering, via a control system and based on volumetric data, one or more subjects as one or more holographic projections in one or more remote venues, wherein the rendering comprises dynamically re-lighting the one or more holographic projections to match lighting conditions at each remote venue based on data from one or more lighting sensors at each remote venue; synchronizing, via the control system, the one or more holographic projections and experience elements across the one or more remote venues; capturing and transmitting, via the control system, real-time audience feedback; and adapting, via the control system, the experience elements based on the real-time audience feedback. The volumetric data of the one or more subjects is captured via a volumetric capture rig, and the volumetric data is encoded and transmitted via a low-latency streaming module.

In some implementations, the method further includes enabling real-time interactions between the one or more sand one or more remote audiences at the one or more remote venues, wherein the real-time interactions are transmitted bidirectionally.

In some implementations, the method further includes delivering simultaneous experiences to underserved or geographically distant markets by minimizing latency to thereby preserve the sense of live presence.

In some implementations, the method further includes adapting lighting and visual effects in each of the one or more remote venues based on local environmental conditions associated with each of the one or more remote venues by dynamically adjusting the holographic projection.

In some implementations, the method further includes ensuring temporal alignment of show elements across the one or more remote venues, wherein the multi-venue synchronization operating system coordinates timing and effects.

In some implementations, the method further includes collecting and analyzing biometric and behavioral data from one or more audiences at the one or more remote venues, wherein the data is used to adapt the experience in real time.

In some implementations, the method further includes providing a feedback loop wherein aggregated audience reactions influence the live experience of each audience at the one or more remote venues, and wherein the control system further adapts experience elements in response to the real-time audience feedback.

In some implementations, the volumetric data is represented using a collection of Gaussian splats, each Gaussian splat encoding position, color, orientation, scale, and opacity to enable photorealistic rendering and dynamic re-lighting.

According to another aspect, a real-time volumetrically captured, holographically projected experience low-latency streaming system includes a. a volumetric capture rig configured to capture volumetric data from one or more subjects in three dimensions in real time; and b. a low-latency streaming module configured to encode, compress, and transmit the volumetric data to one or more remote venues. One or more holographic display devices are located at each of the one or more remote venues and configured to render the volumetric data as one or more holograms visible from multiple angles. An audio system is synchronized with the one or more holographic display devices to provide audio corresponding to the one or more subjects' locations and movement. A real-time audience feedback module comprising sensors and software is configured to capture crowd data and to transmit the crowd data back to the one or more subjects or the one or more remote venues. An orchestration layer is configured to synchronize visual, audio, and interactive elements across the one or more remote venues, and the orchestration layer is further configured to dynamically re-light the hologram to match lighting conditions at each of the one or more remote venues based on data from one or more lighting sensors at each remote venue.

In some implementations, the volumetric capture rig comprises a multi-camera array and a real-time 3D reconstruction software module and is configured to generate real-time, photorealistic 3D representations of the one or more subjects.

In some implementations, the low-latency streaming module utilizes edge computing resources, adaptive bitrate streaming, or volumetric codecs selected from the group consisting of: MPEG V-PCC, V-Nova VC6, and AV1 extensions.

In some implementations, the one or more holographic display devices are selected from the group consisting of: holographic scrims, Pepper's Ghost systems, lenticular lenses, transparent LED screens, rear-projection foils, anamorphic displays, floating light-field technology, LED volumetric arrays, or combinations thereof, and wherein the one or more holographic display devices are configured to render the one or more subjects as one or more spatially present holograms visible from multiple angles.

In some implementations, the orchestration layer is configured to adapt the one or more holographic projections to local venue lighting and environmental conditions associated with each of the one or more remote venues by using camera systems to observe lighting at each remote venue and a software stack to re-light the 3D representation to match the local venue lighting and environmental conditions.

In some implementations, the orchestration layer further comprises a multi-venue synchronization operating system and wherein the multi-venue synchronization operating system is configured to permit temporal and experiential unison across all of the one or more remote venues.

In some implementations, the real-time audience feedback module comprises computer vision cameras, microphone arrays, and biometric sensors, and is configured to capture and analyze audience sentiment, engagement, and emotional response in real time.

In some implementations, the orchestration layer is further configured to trigger remote lighting, audio, and visual effects in response to actions performed by the one or more subjects or audience feedback.

In some implementations, the audio system comprises a spatial audio system synchronized with the one or more holographic display devices to provide spatial audio corresponding to the one or more subjects' locations and movement.

In some implementations, the spatial audio system comprises beamforming or object-based audio technology and is configured to deliver positional audio that tracks the location of the hologram within each venue.

In some implementations, the volumetric capture rig is portable, and is configured for rapid deployment, setup, and takedown in a variety of environments.

In some implementations, the low-latency streaming module further utilizes network redundancy edge cloud infrastructure and is configured to maintain uninterrupted data transmission during network failures or congestion.

In some implementations, the real-time audience feedback module is further configured to transmit aggregated crowd sentiment data to the one or more subjects or to the one or more remote venues in real-time such that the one or more subjects may adapt the performance or crowds at the one or more remote venues may adapt their behavior in response to the aggregated crowd sentiment data.

In some implementations, the multi-venue synchronization operating system is further configured to synchronize interactive elements across the one or more remote venues.

In some implementations, the volumetric capture rig is configured to represent the volumetric data using a collection of Gaussian splats, each Gaussian splat encoding position, color, orientation, scale, and opacity to enable photorealistic rendering and dynamic re-lighting.

According to another aspect, a method for delivering a real-time volumetric holographic rendering includes capturing, via a volumetric capture rig, volumetric data of one or more subjects; and encoding and transmitting, via a low-latency streaming module, the volumetric data. The one or more subjects are rendered, via a control system and based on the volumetric data, as one or more holographic projections in one or more remote venues. The rendering comprises dynamically re-lighting the one or more holographic projections to match lighting conditions at each remote venue based on data from one or more lighting sensors at each remote venue. The one or more holographic projections and experience elements are synchronized, via the control system, across the one or more remote venues. The real-time audience is captured and transmitted, via the control system, and the experience elements are adapted, via the control system, based on the real-time audience feedback.

In some implementations, real-time interactions are enabled between the one or more sand one or more remote audiences at the one or more remote venues, wherein the real-time interactions are transmitted bidirectionally.

In some implementations, simultaneous experiences are delivered to underserved or geographically distant markets by minimizing latency to thereby preserve the sense of live presence.

In some implementations, lighting and visual effects are adapted in each of the one or more remote venues based on local environmental conditions associated with each of the one or more remote venues by dynamically adjusting the holographic projection.

In some implementations, temporal alignment of show elements is ensured across the one or more remote venues, wherein the multi-venue synchronization operating system coordinates timing and effects.

In some implementations, biometric and behavioral data is collected and analyzed from one or more audiences at the one or more remote venues, wherein the data is used to adapt the experience in real time.

In some implementations, a feedback loop is provided wherein aggregated audience reactions influence the live experience of each audience at the one or more remote venues, and wherein the control system further adapts experience elements in response to the real-time audience feedback.

In some implementations, the volumetric data is represented using a collection of Gaussian splats, each Gaussian splat encoding position, color, orientation, scale, and opacity to enable photorealistic rendering and dynamic re-lighting.

The present technology is not to be limited in terms of the particular implementations described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular implementations only, and is not intended to be limiting.

While certain implementations have been described, these implementations have been presented by way of example only and are not intended to limit the scope of the present disclosures. Indeed, the novel methods, apparatuses, modules, instruments and systems described herein can be embodied in a variety of other forms; furthermore, various omissions, substitutions and changes in the form of the methods, apparatuses, modules, instruments and systems described herein can be made without departing from the spirit of the present disclosures. The accompanying claims and their equivalents are intended to cover such forms or modifications as would fall within the scope and spirit of the present disclosures.

What is claimed is:

1. A system for streaming a real-time volumetrically captured, holographically projected experience with a low-latency, the system comprising:
   a volumetric capture rig configured to capture volumetric data of a subject at a primary venue in three dimensions in real time;
   a low-latency streaming module configured to encode, compress, and transmit the volumetric data to a plurality of remote venues remote from the primary venue;
   one or more holographic display devices located at each of the plurality of remote venues and configured to render the volumetric data as one or more holograms visible from multiple angles;
   an audio system synchronized with the one or more holographic display devices and configured to provide audio according to locations and movement of the subject;
   a real-time audience feedback module comprising sensors and software, the real-time audience feedback module being configured to capture crowd data at one of the plurality of remote venues and to transmit the crowd data to (i) the primary venue and (ii) another of the plurality of remote venues; and
   one or more processors comprising an orchestration layer that is configured to synchronize visual, audio, and interactive elements across the plurality of remote venues, wherein the orchestration layer is further configured to dynamically re-light the one or more holograms to match lighting conditions at each of the plurality of venues based on the crowd data transmitted from at least one of the plurality of remote venues,
   wherein the orchestration layer is further configured to, in response to audience feedback received from a first remote venue among the plurality of remote venues, trigger remote lighting, audio, and visual effects at a second remote venue among the plurality of remote venues to thereby synchronize the interactive elements across the primary venue, the first remote venue, and the second remote venue.

2. The system of claim 1, wherein the volumetric capture rig comprises a multi-camera array and a real-time 3D reconstruction software module and is configured to generate real-time, photorealistic 3D representations of the subject.

3. The system of claim 1, wherein the low-latency streaming module is configured to utilize edge computing resources, adaptive bitrate streaming, or volumetric codecs including at least one of: MPEG V-PCC, V-Nova VC6, and AV1 extensions.

4. The system of claim 1, wherein the one or more holographic display devices comprise at least one of: holographic scrims, Pepper's Ghost systems, lenticular lenses, transparent LED screens, rear-projection foils, anamorphic displays, floating light-field technology, LED volumetric arrays, or combinations thereof, and
   wherein the one or more holographic display devices are configured to render the subject as one or more spatially present holograms visible from multiple angles.

5. The system of claim 1, wherein the orchestration layer is configured to adapt one or more holographic projections to local venue lighting and environmental conditions associated with each of the plurality of remote venues by using (i) camera systems to observe lighting at each remote venue and (ii) a software stack to re-light a 3D representation to match the local venue lighting and environmental conditions.

6. The system of claim 1, wherein the orchestration layer further comprises a multi-venue synchronization operating system configured to permit temporal and experiential unison across all of the plurality of remote venues.

7. The system of claim 1, wherein the real-time audience feedback module comprises computer vision cameras, microphone arrays, and biometric sensors, and is configured to capture and analyze audience sentiment, engagement, and emotional response in real time.

8. The system of claim 1, wherein the audio system comprises a spatial audio system synchronized with the one or more holographic display devices and configured to provide spatial audio corresponding to the locations and movement of the subject.

9. The system of claim 8, wherein the spatial audio system comprises beamforming or object-based audio technology and is configured to deliver positional audio that tracks a location of the one or more holograms within each venue.

10. The system of claim 1, wherein the volumetric capture rig is portable and is configured for rapid deployment, setup, and takedown in a plurality of environments.

11. The system of claim 1, wherein the low-latency streaming module is configured to utilize network redundancy edge cloud infrastructure and is configured to maintain uninterrupted data transmission during network failures or congestion.

12. The system of claim 7, wherein the real-time audience feedback module is further configured to transmit aggregated crowd sentiment data to the primary venue or to the plurality of remote venues in real-time such that (i) the subject adapt a performance or (ii) crowds at the plurality of remote venues adapt their behavior in response to the aggregated crowd sentiment data.

13. The system of claim 6, wherein the multi-venue synchronization operating system is further configured to synchronize interactive elements across the one or more remote venues.

14. The system of claim 1, wherein the volumetric capture rig is configured to represent the volumetric data using a collection of Gaussian splats, each Gaussian splat encoding position, color, orientation, scale, and opacity to enable photorealistic rendering and dynamic re-lighting.

15. A method for delivering a real-time volumetric holographic rendering, the method comprising:

capturing, via a volumetric capture rig, volumetric data of a subject at a primary venue in three dimensions in real time;

encoding and transmitting, via a low-latency streaming module, the volumetric data to a plurality of remote venues remote from the primary venue;

rendering, via a control system and based on the volumetric data, the subject as one or more holographic projections in the plurality of remote venues, wherein the rendering comprises dynamically re-lighting the one or more holographic projections to match lighting conditions at each remote venue based on data from one or more lighting sensors at each remote venue;

synchronizing, via the control system, the one or more holographic projections and experience elements across the plurality of remote venues;

capturing, via the control system, real-time audience feedback of crowd at one of the plurality of remote venues;

transmitting the real-time audience feedback to (i) the primary venue and (ii) another of the plurality of remote venues; and adapting, via the control system, the experience elements based on the real-time audience feedback transmitted from at least one of the plurality of remote venues, wherein adapting the experience elements comprises:

in response to audience feedback received from a first remote venue among the plurality of remote venues, triggering remote lighting, audio, and visual effects at a second remote venue among the plurality of remote venues to thereby synchronize the experience elements across the primary venue, the first remote venue, and the second remote venue.

16. The method of claim 15, further comprising enabling real-time interactions between the subject and one or more remote audiences at the plurality of remote venues, wherein the real-time interactions are transmitted bidirectionally.

17. The method of claim 15, further comprising delivering simultaneous experiences to underserved or geographically distant markets by minimizing latency to thereby preserve a sense of live presence.

18. The method of claim 15, further comprising adapting lighting and visual effects in each of the plurality of remote venues based on local environmental conditions associated with each of the plurality of remote venues by dynamically adjusting the one or more holographic projections.

19. The method of claim 15, further comprising ensuring temporal alignment of show elements across the plurality of remote venues, wherein the control system coordinates timing and effects.

20. The method of claim 15, further comprising collecting and analyzing biometric and behavioral data from one or more audiences at the plurality of remote venues, the biometric and behavioral data being used to adapt the experience elements in real time.

21. The method of claim 15, further comprising providing a feedback loop such that aggregated audience reactions influence a live experience of each audience at the plurality of remote venues, and wherein the control system further adapts the experience elements in response to the real-time audience feedback.

22. The method of claim 15, wherein the volumetric data are represented using a collection of Gaussian splats, each Gaussian splat encoding position, color, orientation, scale, and opacity to enable photorealistic rendering and dynamic re-lighting.

23. The system of claim 1, wherein the low-latency is in a range less than or equal to 150 ms.

* * * * *